(12) United States Patent
Yamaguchi

(10) Patent No.: US 10,782,512 B2
(45) Date of Patent: Sep. 22, 2020

(54) ZOOM OPTICAL SYSTEM, OPTICAL DEVICE AND METHOD FOR MANUFACTURING THE ZOOM OPTICAL SYSTEM

(71) Applicant: NIKON CORPORATION, Minato-ku, Tokyo (JP)

(72) Inventor: Satoshi Yamaguchi, Sagamihara (JP)

(73) Assignee: Nikon Corporation, Tokyo (JP)

( * ) Notice: Subject to any disclaimer, the term of this patent is extended or adjusted under 35 U.S.C. 154(b) by 124 days.

(21) Appl. No.: 15/575,399

(22) PCT Filed: May 27, 2016

(86) PCT No.: PCT/JP2016/065715
§ 371 (c)(1),
(2) Date: Apr. 30, 2018

(87) PCT Pub. No.: WO2016/194811
PCT Pub. Date: Dec. 8, 2016

(65) Prior Publication Data
US 2018/0252903 A1    Sep. 6, 2018

(30) Foreign Application Priority Data
May 29, 2015 (JP) .................................. 2015-109802

(51) Int. Cl.
*G02B 15/14* (2006.01)
*G02B 15/173* (2006.01)
(Continued)

(52) U.S. Cl.
CPC ... *G02B 15/173* (2013.01); *G02B 15/145121* (2019.08); *G02B 15/20* (2013.01); *G02B 27/646* (2013.01); *G02B 13/18* (2013.01)

(58) Field of Classification Search
CPC ...... G02B 15/14; G02B 15/16; G02B 15/163; G02B 15/167; G02B 15/173; G02B 15/20
(Continued)

(56) References Cited

U.S. PATENT DOCUMENTS

2002/0008919 A1* 1/2002 Yamanashi .......... G02B 15/173
359/683
2005/0275949 A1 12/2005 Fujimoto et al.
(Continued)

FOREIGN PATENT DOCUMENTS

JP    H11-174327 A    7/1999
JP    2005-352057 A    12/2005
(Continued)

OTHER PUBLICATIONS

International Search Report from International Patent Application No. PCT/JP2016/065715, dated Aug. 2, 2016.
(Continued)

*Primary Examiner* — Darryl J Collins
(74) *Attorney, Agent, or Firm* — SGPatents PLLC

(57) ABSTRACT

A zoom optical system (ZL) comprises a first lens group (G1) having positive refractive power, a second lens group (G2) having negative refractive power, a third lens group (G3) having positive refractive power, a fourth lens group (G4) having negative refractive power, and a fifth lens group (G5) having positive refractive power that are disposed in order from an object. Upon zooming from a wide angle end state to a telephoto end state, the lens groups are moved along an optical axis to change distances between the lens groups. The fifth lens group (G5) comprises at least one positive lens and at least one negative lens. Certain conditional expressions are satisfied.

23 Claims, 23 Drawing Sheets

(51) Int. Cl.
*G02B 15/20* (2006.01)
*G02B 27/64* (2006.01)
*G02B 13/18* (2006.01)

(58) Field of Classification Search
USPC .................................. 359/676–679, 683–685
See application file for complete search history.

(56) References Cited

U.S. PATENT DOCUMENTS

| | | | |
|---|---|---|---|
| 2006/0203356 | A1 | 9/2006 | Fujimoto et al. |
| 2009/0161227 | A1 | 6/2009 | Yamamoto et al. |
| 2009/0244720 | A1* | 10/2009 | Yamaguchi .......... G02B 15/173 359/690 |
| 2010/0220400 | A1 | 9/2010 | Yamamoto et al. |
| 2011/0032402 | A1 | 2/2011 | Nanba |
| 2011/0080650 | A1 | 4/2011 | Nanba |
| 2011/0157717 | A1 | 6/2011 | Nanba |
| 2012/0188647 | A1 | 7/2012 | Tanaka et al. |
| 2013/0050844 | A1 | 2/2013 | Li |
| 2013/0100335 | A1 | 4/2013 | Nanba |
| 2013/0235466 | A1 | 9/2013 | Iwamoto |
| 2013/0242408 | A1 | 9/2013 | Nanba |
| 2013/0250435 | A1* | 9/2013 | Hagiwara ............ G02B 15/173 359/684 |
| 2014/0009652 | A1 | 1/2014 | Sugita |
| 2014/0009832 | A1 | 1/2014 | Sugita |
| 2014/0022447 | A1 | 1/2014 | Takahashi et al. |
| 2014/0177065 | A1 | 6/2014 | Adachi |
| 2014/0218800 | A1* | 8/2014 | Li ........................ G02B 27/646 359/557 |
| 2015/0131163 | A1* | 5/2015 | Noda ................... G02B 15/177 359/680 |
| 2015/0153550 | A1 | 6/2015 | Yamaguchi et al. |
| 2015/0234166 | A1* | 8/2015 | Maetaki .............. G02B 15/173 359/684 |

FOREIGN PATENT DOCUMENTS

| | | |
|---|---|---|
| JP | 2006-234892 A | 9/2006 |
| JP | 2007-156251 A | 6/2007 |
| JP | 2009-156890 A | 7/2009 |
| JP | 2010-175899 A | 8/2010 |
| JP | 2010-191199 A | 9/2010 |
| JP | 2011-039091 A | 2/2011 |
| JP | 2011-075975 A | 4/2011 |
| JP | 2011-090185 A | 5/2011 |
| JP | 2011-133740 A | 7/2011 |
| JP | 2012-042549 A | 3/2012 |
| JP | 2013-011819 A | 1/2013 |
| JP | 2013-044795 A | 3/2013 |
| JP | 2013-088737 A | 5/2013 |
| JP | 2013-134304 A | 7/2013 |
| JP | 2013-182246 A | 9/2013 |
| JP | 2013-190453 A | 9/2013 |
| JP | 2013-190534 A | 9/2013 |
| JP | 2014-010425 A | 1/2014 |
| JP | 2014-016464 A | 1/2014 |
| JP | 2014-021367 A | 2/2014 |
| JP | 2014-035478 A | 2/2014 |
| JP | 2014-126678 A | 7/2014 |
| JP | 2014-153675 A | 8/2014 |
| JP | 2014-219480 A | 11/2014 |
| JP | 2015-026031 A | 2/2015 |
| JP | 2015-055858 A | 3/2015 |
| JP | 2015-075570 A | 4/2015 |
| JP | 2015-118141 A | 6/2015 |
| WO | WO 2015/075948 A1 | 5/2015 |

OTHER PUBLICATIONS

English translation of International Preliminary Report on Patentability from International Patent Application No. PCT/JP2016/065715, dated Dec. 14, 2017.

Office Action dated Jul. 31, 2018, in Japanese Patent Application No. 2017-521899.

Office Action dated Mar. 5, 2019, in Japanese Patent Application No. 2017-521899.

Decision of Refusal dated Oct. 8, 2019, in Japanese Patent Application No. 2017-521899.

Decision of Dismissal of Amendment dated Oct. 8, 2019, in Japanese Patent Application No. 2017-521899.

Office Action dated Sep. 12, 2019, in Chinese Patent Application No. 201680031513.6 .

Office Action issued Jul. 9, 2020, in Chinese Patent Application No. 201680031513.6.

* cited by examiner

LATERAL ABERRATION

SPHERICAL ABERRATION
ASTIGMATISM
DISTORTION(d-line)
LATERAL ABERRATION
LATERAL CHROMATIC ABERRATION

LATERAL ABERRATION

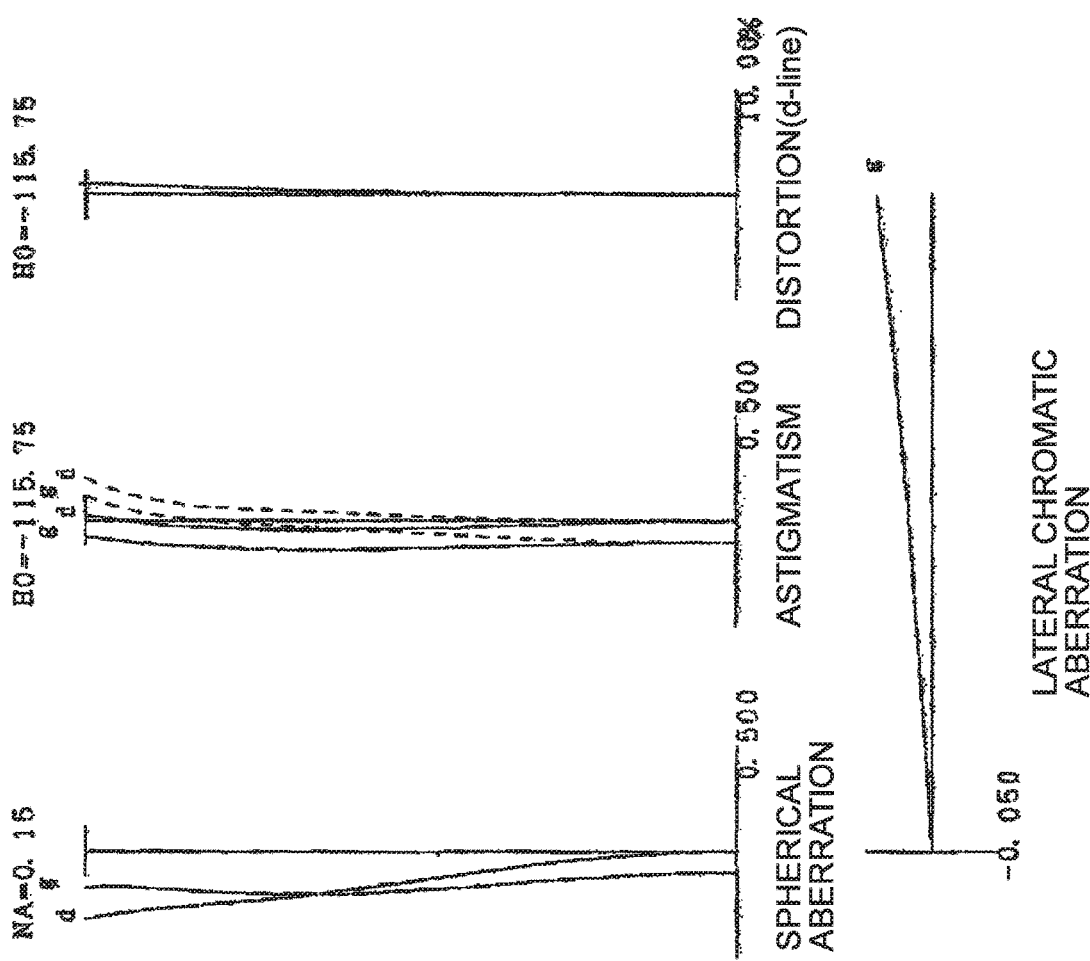

LATERAL ABERRATION

ZOOM OPTICAL SYSTEM, OPTICAL DEVICE AND METHOD FOR MANUFACTURING THE ZOOM OPTICAL SYSTEM

TECHNICAL FIELD

The present invention relates to a zoom optical system, an optical device and a method for manufacturing the zoom optical system.

TECHNICAL BACKGROUND

A zoom optical system suitable for photographic cameras, electronic still cameras, video cameras, and the like has conventionally been proposed (see, for example, Patent Document 1).

PRIOR ARTS LIST

Patent Document

Patent Document 1: Japanese Laid-Open Patent Publication No. 2005-352057 (A)

However, conventional zoom optical systems have a problem in that a further increase in zooming and angle of view would result in an increase in size and fail to achieve preferable optical performance.

SUMMARY OF THE INVENTION

A zoom optical system according to the present invention comprises a first lens group having positive refractive power, a second lens group having negative refractive power, a third lens group having positive refractive power, a fourth lens group having negative refractive power, and a fifth lens group having positive refractive power that are disposed in order from an object. Upon zooming from a wide angle end state to a telephoto end state, the lens groups are moved along an optical axis to change a distance between the first lens group and the second lens group, a distance between the second lens group and the third lens group, a distance between the third lens group and the fourth lens group, and a distance between the fourth lens group and the fifth lens group. The fifth lens group comprises at least one positive lens and at least one negative lens. The following expressions are satisfied:

$$0.80 < (-f4)/f5w < 2.50$$

$$FNw < 3.50$$

where, f4 denotes a focal length of the fourth lens group, f5w denotes a composite focal length of an optical system on an image side including the fifth lens group in the wide angle end state, and FNw denotes an F number of the whole system in the wide angle end state.

A method for manufacturing a zoom optical system according to the present invention is a method for manufacturing a zoom optical system comprising a first lens group having positive refractive power, a second lens group having negative refractive power, a third lens group having positive refractive power, a fourth lens group having negative refractive power, and a fifth lens group having positive refractive power that are disposed in order from an object. The method for manufacturing a zoom optical system comprises: upon zooming from a wide angle end state to a telephoto end state, arranging the lens groups so as to move along an optical axis to change a distance between the first lens group and the second lens group, a distance between the second lens group and the third lens group, a distance between the third lens group and the fourth lens group, and a distance between the fourth lens group and the fifth lens group; and arranging at least one positive lens and at least one negative lens in the fifth lens group, wherein the following expressions are satisfied:

$$0.80 < (-f4)/f5w < 2.50$$

$$FNw < 3.50$$

where, f4 denotes a focal length of the fourth lens group, f5w denotes a composite focal length of an optical system on an image side including the fifth lens group in the wide angle end state, and FNw denotes an F number of the whole system in the wide angle end state.

BRIEF DESCRIPTION OF THE DRAWINGS

FIGS. 5A-5C are various aberration graphs of the zoom optical system in a focusing-on-a-short-distant-object state according to Example 1, FIG. 5A being a various aberration graph in a wide angle end state, FIG. 5B being a various aberration graph in an intermediate focal length state, FIG. 5C being a various aberration graph in a telephoto end state.

DESCRIPTION OF THE EMBODIMENTS

Figure 1:
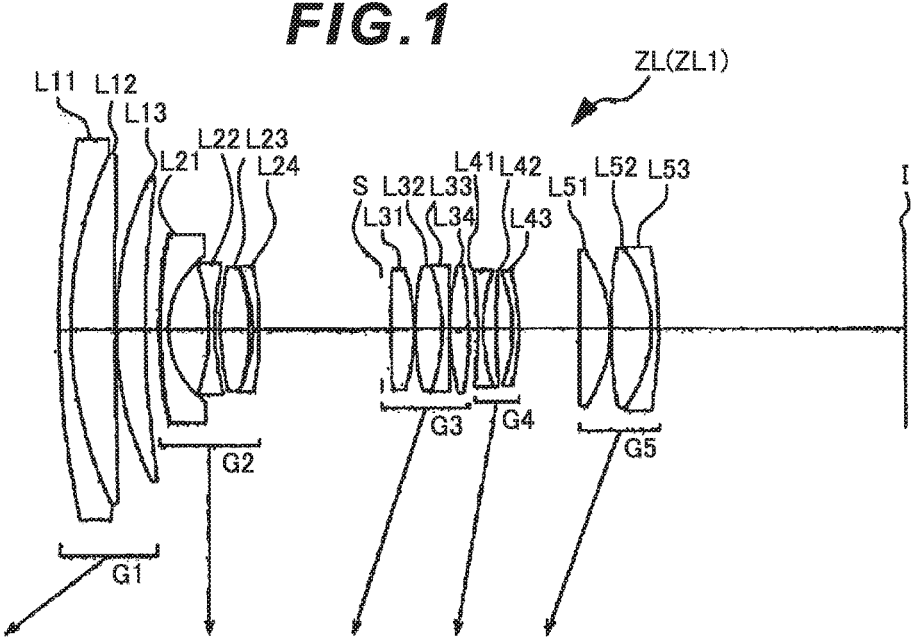
FIG. 1 is a cross-sectional diagram illustrating a lens configuration of a zoom optical system according to Example 1.
Figure 1:
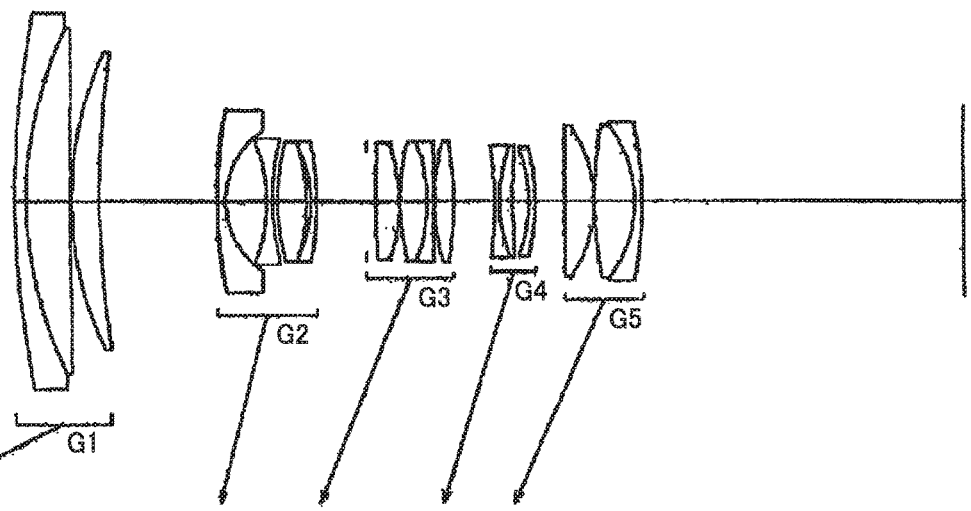
Figure 1:
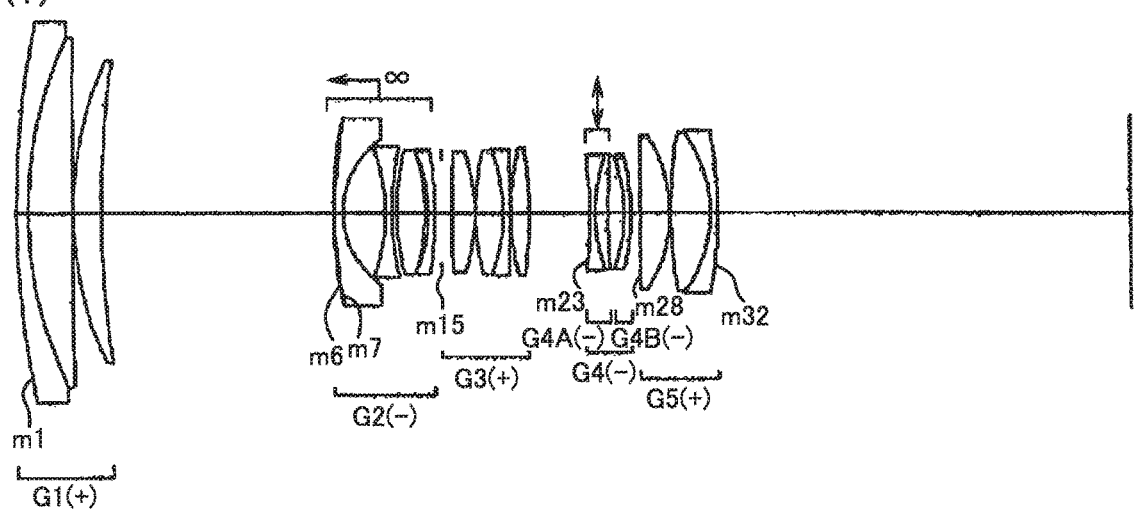

Preferred embodiments of the present invention are described below with reference to the drawings. As illustrated in FIG. 1, a zoom optical system ZL according to the present embodiment has a configuration including: a first lens group G1 having positive refractive power; a second lens group G2 having negative refractive power; a third lens group G3 having positive refractive power; a fourth lens group 4G having negative refractive power; and a fifth lens group G5 having positive refractive power that are disposed in order from an object. In the zoom optical system ZL, upon zooming from a wide angle end state to a telephoto end state, the lens groups G1 to G5 are moved along the optical axis to change a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5. In the zoom optical system ZL, the fifth lens group G5 includes at least one positive lens and at least one negative lens. With such a configuration, a lens with a high F number and excellent optical performance can be achieved.

The zoom optical system ZL according to the present embodiment preferably satisfies the following conditional expression (1).

$$0.80 < (-f4)/f5w < 2.50 \qquad (1)$$

where, f4 denotes a focal length of the fourth lens group G4, and f5w denotes a composite focal length of an optical system on an image side including the fifth lens group G5 in the wide angle end state.

The conditional expression (1) is for setting a ratio of the focal length of the fourth lens group G4 and the composite focal length of the optical system on the image side including the fifth lens group G5 in the wide angle end state. f5w in a five-group configuration as in Example 1 and Example 2 described below is the focal length of the fifth lens group G5, and f5w in a six-group configuration as in Example 3 is the composite focal length of the fifth lens group G5 and the sixth lens group G6 in the wide angle end state. Variation of aberrations upon zooming can be reduced while achieving an increase in zooming, size of aperture, and angle of view when the conditional expression (1) is satisfied. Furthermore, the outer diameters of the third lens group G3 and the fourth lens group G4 can be made small, thereby achieving a small size of the barrel. A value higher than the upper limit value of the conditional expression (1) unfavorably leads to excessively large refractive power of the fifth lens group G5 and deteriorated imaging performance due to manufacturing errors, that is, excessively large decentering coma aberrations and decentering image surface collapse. To guarantee the effects of the conditional expression (1), the upper limit value of the conditional expression (1) is preferably set to be 2.00. To further guarantee the effects of the conditional expression (1), the upper limit value of the conditional expression (1) is preferably set to be 1.40. To further guarantee the effects of the conditional expression (1), the upper limit value of the conditional expression (1) is preferably set to be 1.10. A value lower than the lower limit value of the conditional expression (1) leads to excessively large refractive power of the fourth lens group G4 and excessively large variation of coma aberrations upon zooming. This also unfavorably leads to an increase in the diameter of the third lens group G3, an excessively large increase in the product diameter and in high-order spherical aberrations, which renders such aberrations difficult to correct. To guarantee the effects of the conditional expression (1), the lower limit value of the conditional expression (1) is preferably set to be 0.84. To further guarantee the effects of the conditional expression (1), the lower limit value of the conditional expression (1) is preferably set to be 0.88.

The zoom optical system ZL according to the present embodiment preferably satisfies the following conditional expression (2).

$$FNw < 3.50 \qquad (2)$$

where,

FNw denotes an F number of the whole system in the wide angle end state.

The conditional expression (2) is for setting the F number of the whole system of the zoom optical system ZL according to the present embodiment in the wide angle end state. A larger aperture can be achieved and spherical aberrations and the like can be successfully corrected when the conditional expression (2) is satisfied. To guarantee the effects of the conditional expression (2), the upper limit value of the conditional expression (2) is preferably set to be 3.30. To further guarantee the effects of the conditional expression (2), the upper limit value of the conditional expression (2) is preferably set to be 3.10. To further guarantee the effects of the conditional expression (2), the upper limit value of the conditional expression (2) is preferably set to be 2.90.

The zoom optical system ZL according to the present embodiment preferably satisfies the following conditional expressions (3) and (4).

$$0.30 < N5n - N5p \quad (3)$$

$$1.85 < N5n \quad (4)$$

where,

N5n denotes an average refractive index with respect to the d line of all the negative lens media in the fifth lens group G5, and N5p denotes an average refractive index with respect to the d line of all the positive lens media in the fifth lens group G5.

The conditional expressions (3) and (4) are for setting a refractive index of a lens medium in the fifth lens group G5. The curvature of the lens surface in the fifth lens group G5 can be reduced and high-order spherical aberrations, coma aberrations, and curvature of field, which would cause a problem in increasing the aperture and angle of view, can be successfully corrected when the conditional expressions (3) and (4) are satisfied. To guarantee the effects of the conditional expression (3), the lower limit value of the conditional expression (3) is preferably set to be 0.33. To further guarantee the effects of the conditional expression (3), the lower limit value of the conditional expression (3) is preferably set to be 0.35. To guarantee the effects of the conditional expression (4), the lower limit value of the conditional expression (4) is preferably set to be 1.86. To further guarantee the effects of the conditional expression (4), the lower limit value of the conditional expression (4) is preferably set to be 1.88.

The zoom optical system ZL according to the present embodiment preferably satisfies the following conditional expression (5).

$$3.50 < ft/fw \quad (5)$$

where, fw denotes a focal length of the whole system in the wide angle end state, and ft denotes a focal length of the whole system in the telephoto end state.

The conditional expression (5) is for setting a ratio of the focal length of the whole system in the telephoto end state and the focal length of the whole system in the wide angle end state, that is, a zooming rate. A higher zooming rate can be achieved and spherical aberrations and coma aberrations can be successfully corrected when the conditional expression (5) is satisfied. To guarantee the effects of the conditional expression (5), the lower limit value of the conditional expression (5) is preferably set to be 3.80. To guarantee the effects of the conditional expression (5), the lower limit value of the conditional expression (5) is preferably set to be 4.00.

The zoom optical system ZL according to the present embodiment preferably satisfies the following conditional expression (6).

$$FNt < 4.50 \quad (6)$$

where,

FNt denotes an F number of the whole system in the telephoto end state.

The conditional expression (6) is for setting the F number of the whole system of the zoom optical system ZL according to the present embodiment in the telephoto end state. A larger aperture can be achieved and spherical aberrations and the like can be successfully corrected when the conditional expression (6) is satisfied. To guarantee the effects of the conditional expression (6), the upper limit value of the conditional expression (6) is preferably set to be 4.40. To further guarantee the effects of the conditional expression (6), the upper limit value of the conditional expression (6) is preferably set to be 4.30. To further guarantee the effects of the conditional expression (6), the upper limit value of the conditional expression (6) is preferably set to be 4.20.

In the zoom optical system ZL according to the present embodiment, upon zooming from a wide angle end state to a telephoto end state, the lens groups are preferably configured to be moved along the optical axis to increase a distance between the first lens group G1 and the second lens group G2, decrease a distance between the second lens group G2 and the third lens group G3, increase a distance between the third lens group G3 and the fourth lens group G4, and decrease a distance between the fourth lens group G4 and the fifth lens group G5. With this configuration, a higher zooming rate and reduced power (refractive power) of the lens groups can be achieved and reduction in high-order aberrations and deteriorated imaging performance in manufacturing can be maintained small.

The zoom optical system ZL according to the present embodiment preferably satisfies the following conditional expression (7).

$$2.50 < f1/f3 < 4.20 \quad (7)$$

where, f1 denotes the focal length of the first lens group G1, and f3 denotes the focal length of the third lens group G3.

The conditional expression (7) is for setting a ratio of the focal lengths of the first lens group G1 and the third lens group G3. Aberrations while achieving an increase in size of aperture and angle of view can be achieved in a balanced manner when the conditional expression (7) is satisfied. A value higher than the upper limit value of the conditional expression (7) leads to excessively large refractive power of the third lens group G3, rendering high-order spherical aberrations and coma aberrations, while achieving an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (7), the upper limit value of the conditional expression (7) is preferably set to be 4.00. To further guarantee the effects of the conditional expression (7), the upper limit value of the conditional expression (7) is preferably set to be 3.80. To further guarantee the effects of the conditional expression (7), the upper limit value of the conditional expression (7) is preferably set to be 3.70. A value lower than the lower limit value of the conditional expression (7) leads to excessively large refractive power of the first lens group G1 and excessively large variation of curvature of field upon zooming. Furthermore, an increase in angle of view renders high-order curvature of field difficult to correct. This also unfavorably leads to an increase in the diameter of the first lens group G1 and an increase in the product diameter. To guarantee the effects of the conditional expression (7), the lower limit value of the conditional expression (7) is preferably set to be 2.80. To further guarantee the effects of the conditional expression (7), the lower limit value of the conditional expression (7) is preferably set to be 3.10. To further guarantee the effects of the conditional expression (7), the lower limit value of the conditional expression (7) is preferably set to be 3.30.

The zoom optical system ZL according to the present embodiment preferably satisfies the following conditional expression (8).

$$0.25 < f2/f4 < 0.55 \qquad (8)$$

where, f2 denotes the focal length of the second lens group G2, and f4 denotes the focal length of the fourth lens group G4.

The conditional expression (8) is for setting a ratio of the focal lengths of the second lens group G2 and the fourth lens group G4. Aberrations while achieving an increase in size of aperture and angle of view can be achieved in a balanced manner when the conditional expression (8) is satisfied. A value higher than the upper limit value of the conditional expression (8) leads to excessively large refractive power of the fourth lens group G4, rendering high-order spherical aberrations and coma aberrations, while achieving an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (8), the upper limit value of the conditional expression (8) is preferably set to be 0.50. To further guarantee the effects of the conditional expression (8), the upper limit value of the conditional expression (8) is preferably set to be 0.45. To further guarantee the effects of the conditional expression (8), the upper limit value of the conditional expression (8) is preferably set to be 0.40. A value lower than the lower limit value of the conditional expression (8) leads to excessively large refractive power of the second lens group G2 and excessively large variation of curvature of field upon zooming. Furthermore, an increase in angle of view renders high-order curvature of field difficult to correct. This also unfavorably leads to an increase in the diameter of the first lens group G1 and an increase in the product diameter. To guarantee the effects of the conditional expression (8), the lower limit value of the conditional expression (8) is preferably set to be 0.28. To further guarantee the effects of the conditional expression (8), the lower limit value of the conditional expression (8) is preferably set to be 0.30. To further guarantee the effects of the conditional expression (8), the lower limit value of the conditional expression (8) is preferably set to be 0.33.

The zoom optical system ZL according to the present embodiment preferably satisfies the following conditional expression (9).

$$1.85 < N2\text{max} \qquad (9)$$

where,

N2max denotes a maximum absolute value of the refractive index with respect to the d line of the lens medium in the second lens group G2.

The conditional expression (9) is for setting a refractive index of a lens medium in the second lens group G2. Variation of spherical aberrations and comma aberrations upon zooming can be reduced when the conditional expression (9) is satisfied. To guarantee the effects of the conditional expression (9), the lower limit value of the conditional expression (9) is preferably set to be 1.86. To further guarantee the effects of the conditional expression (9), the lower limit value of the conditional expression (9) is preferably set to be 1.88.

The zoom optical system ZL according to the present embodiment preferably satisfies the following conditional expression (10).

$$0.4 < fw/f3 < 1.00 \qquad (10)$$

where, fw denotes the focal length of the whole system in the wide angle end state, and f3 denotes the focal length of the third lens group G3.

The conditional expression (10) is for setting a ratio of the focal length of the whole system of the zoom optical system ZL in the wide angle end state and the focal length of the third lens group G3. Correction of high-order aberrations with an increase in size of aperture, reduction in variation of aberrations with a higher zooming rate, and a smaller size of the product can be achieved in a balanced manner when the conditional expression (10) is satisfied. A value higher than the upper limit value of the conditional expression (10) leads to excessively large refractive power of the third lens group G3, rendering high-order spherical aberrations and coma aberrations, due to an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (10), the upper limit value of the conditional expression (10) is preferably set to be 0.90. To further guarantee the effects of the conditional expression (10), the upper limit value of the conditional expression (10) is preferably set to be 0.80. A value lower than the lower limit value of the conditional expression (10) leads to excessively small refractive power of the third lens group G3 and fails to guarantee sufficient zooming. As a result, to guarantee sufficient zooming, the refractive power of the first lens group G1, the second lens group G2, the fifth lens group G5, and the like becomes excessively large, which unfavorably leads to excessively large variation of curvature of field upon zooming and excessively large aberration deterioration and the like in manufacturing due to increased sensitivity of the fifth lens group G5. To guarantee the effects of the conditional expression (10), the lower limit value of the conditional expression (10) is preferably set to be 0.45. To further guarantee the effects of the conditional expression (10), the lower limit value of the conditional expression (10) is preferably set to be 0.50. To further guarantee the effects of the conditional expression (10), the lower limit value of the conditional expression (10) is preferably set to be 0.60.

The zoom optical system ZL according to the present embodiment preferably satisfies the following conditional expression (11).

$$0.30 < fw/(-f4) < 0.80 \qquad (11)$$

where, fw denotes the focal length of the whole system in the wide angle end state, and f4 denotes the focal length of the fourth lens group G4.

The conditional expression (11) is for setting a ratio of the focal length of the whole system of the zoom optical system ZL in the wide angle end state and the focal length of the fourth lens group G4. Correction of high-order aberrations with an increase in size of aperture, reduction in variation of aberrations with a higher zooming rate, and a smaller size of the product can be achieved in a balanced manner when the conditional expression (11) is satisfied. A value higher than the upper limit value of the conditional expression (11) leads to excessively large refractive power of the fourth lens group G4, rendering high-order spherical aberrations and coma aberrations, due to an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (11), the upper limit value of the conditional expression (11) is preferably set to be 0.70. To further guarantee the effects of the conditional expression (11), the upper limit value of the conditional expression (11) is preferably set to be 0.60. A value lower than the lower limit value of the conditional expression (11) leads to excessively small refractive power of the fourth lens group G4 and fails to guarantee sufficient zooming. As a result, to guarantee sufficient zooming, the refractive power of the first lens group G1, the second lens group G2, the fifth lens group G5, and the like becomes excessively large, which unfavorably leads to excessively large variation of curvature of field upon zooming and excessively large aberration deterioration and the like in manufacturing due to increased sensitivity of the fifth lens group G5. To guarantee the effects of the conditional expression (11), the lower limit value of the conditional expression (11) is preferably set to be 0.35. To further guarantee the effects of the conditional expression (11), the lower limit value of the conditional expression (11) is preferably set to be 0.38. To further guarantee the effects of the conditional expression (11), the lower limit value of the conditional expression (11) is preferably set to be 0.42.

The zoom optical system ZL according to the present embodiment preferably satisfies the following conditional expression (12).

$$2.00 < ft/f3 < 5.00 \quad (12)$$

where, ft denotes the focal length of the whole system in the telephoto end state, and f3 denotes the focal length of the third lens group G3.

The conditional expression (12) is for setting a ratio of the focal length of the whole system of the zoom optical system ZL in the telephoto end state and the focal length of the third lens group G3. Correction of high-order aberrations with an increase in size of aperture, reduction in variation of aberrations with a higher zooming rate, and a smaller size of the product can be achieved in a balanced manner when the conditional expression (12) is satisfied. A value higher than the upper limit value of the conditional expression (12) leads to excessively large refractive power of the third lens group G3, rendering high-order spherical aberrations and coma aberrations, due to an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (12), the upper limit value of the conditional expression (12) is preferably set to be 4.50. To further guarantee the effects of the conditional expression (12), the upper limit value of the conditional expression (12) is preferably set to be 4.00. To further guarantee the effects of the conditional expression (12), the upper limit value of the conditional expression (12) is preferably set to be 3.50. A value lower than the lower limit value of the conditional expression (12) leads to excessively small refractive power of the third lens group G3 and fails to guarantee sufficient zooming. As a result, to guarantee sufficient zooming, the refractive power of the first lens group G1, the second lens group G2, the fifth lens group G5, and the like becomes excessively large, which unfavorably leads to excessively large variation of curvature of field upon zooming and excessively large aberration deterioration and the like in manufacturing due to increased sensitivity of the fifth lens group G5. To guarantee the effects of the conditional expression (12), the lower limit value of the conditional expression (12) is preferably set to be 2.40. To further guarantee the effects of the conditional expression (12), the lower limit value of the conditional expression (12) is preferably set to be 2.60. To further guarantee the effects of the conditional expression (12), the lower limit value of the conditional expression (12) is preferably set to be 2.90.

The zoom optical system ZL according to the present embodiment preferably satisfies the following conditional expression (13).

$$1.50 < ft/(-f4) < 4.50 \quad (13)$$

where, ft denotes the focal length of the whole system in the telephoto end state, and f4 denotes the focal length of the fourth lens group G4.

The conditional expression (13) is for setting a ratio of the focal length of the whole system of the zoom optical system ZL in the telephoto end state and the focal length of the fourth lens group G4. Correction of high-order aberrations with an increase in size of aperture, reduction in variation of aberrations with a higher zooming rate, and a smaller size of the product can be achieved in a balanced manner when the conditional expression (13) is satisfied. A value higher than the upper limit value of the conditional expression (13) leads to excessively large refractive power of the fourth lens group G4, rendering high-order spherical aberrations and coma aberrations, due to an increase in size of aperture, difficult to correct. Furthermore, this unfavorably leads to deteriorated imaging performance due to manufacturing errors, that is, excessively large decentering coma aberrations and decentering image surface collapse. To guarantee the effects of the conditional expression (13), the upper limit value of the conditional expression (13) is preferably set to be 4.00. To further guarantee the effects of the conditional expression (13), the upper limit value of the conditional expression (13) is preferably set to be 3.50. To further guarantee the effects of the conditional expression (13), the upper limit value of the conditional expression (13) is preferably set to be 3.00. To further guarantee the effects of the conditional expression (13), the upper limit value of the conditional expression (13) is preferably set to be 2.50. A value lower than the lower limit value of the conditional expression (13) leads to excessively small refractive power of the fourth lens group G4 and fails to guarantee sufficient zooming. As a result, to guarantee sufficient zooming, the refractive power of the first lens group G1, the second lens group G2, the fifth lens group G5, and the like becomes excessively large, which unfavorably leads to excessively large variation of curvature of field upon zooming and excessively large aberration deterioration and the like in manufacturing due to increased sensitivity of the fifth lens group G5. To guarantee the effects of the conditional expression (13), the lower limit value of the conditional expression (13) is preferably set to be 1.60. To further guarantee the effects of the conditional expression (13), the lower limit value of the conditional expression (13) is preferably set to be 1.80. To further guarantee the effects of the conditional expression (13), the lower limit value of the conditional expression (13) is preferably set to be 2.00.

The zoom optical system ZL according to the present embodiment preferably satisfies the following conditional expressions (14) and (15).

$$0.30 < N3n - N3p \quad (14)$$

$$1.85 < N3n \quad (15)$$

where,

N3n denotes an average refractive index with respect to the d line of all the negative lens media in the third lens group G3, and N3p denotes an average refractive index with respect to the d line of all the positive lens media in the third lens group G3.

The conditional expressions (14) and (15) are for setting a refractive index of a lens medium in the third lens group G3. The curvature of the lens surface in the third lens group G3 can be reduced and high-order spherical aberrations and coma aberrations, which would cause a problem in increasing the aperture and the zooming rate, as well as variation of aberrations can be successfully corrected when the conditional expressions (14) and (15) are satisfied. To guarantee the effects of the conditional expression (14), the lower limit value of the conditional expression (14) is preferably set to be 0.33. To guarantee the effects of the conditional expression (15), the lower limit value of the conditional expression (15) is preferably set to be 1.88.

The zoom optical system ZL according to the present embodiment preferably satisfies the following conditional expression (16).

$$25.0° < \omega w < 60.0° \quad (16)$$

where,

ωw denotes a half angle of view in the wide angle end state.

The conditional expression (16) is for setting an optimum value of an angle of view in the wide angle end state. Various aberrations, such as a coma aberration, distortion, and curvature of field, can be successfully corrected while guaranteeing a wide angle of view, when the conditional expression (16) is satisfied. To guarantee the effects of the conditional expression (16), the upper limit value of the conditional expression (16) is preferably set to be 50.0°. To further guarantee the effects of the conditional expression (16), the upper limit value of the conditional expression (16) is preferably set to be 45.0°. To guarantee the effects of the conditional expression (16), the lower limit value of the conditional expression (16) is preferably set to be 30.0°. To further guarantee the effects of the conditional expression (16), the lower limit value of the conditional expression (16) is preferably set to be 35.0°.

The zoom optical system ZL according to the present embodiment preferably satisfies the following conditional expression (17).

$$3.0° < \omega t < 20.0° \quad (17)$$

where,

ωt denotes a half angle of view in the telephoto end state.

The conditional expression (17) is for determining an optimum value of an angle of view in the telephoto end state. Various aberrations, such as a coma aberration, distortion, and curvature of field, can be successfully corrected, when the conditional expression (17) is satisfied. To guarantee the effects of the conditional expression (17), the upper limit value of the conditional expression (17) is preferably set to be 15.0°. To further guarantee the effects of the conditional expression (17), the upper limit value of the conditional expression (17) is preferably set to be 12.0°. To guarantee the effects of the conditional expression (17), the lower limit value of the conditional expression (17) is preferably set to be 5.0°. To further guarantee the effects of the conditional expression (17), the lower limit value of the conditional expression (17) is preferably set to be 7.0°. To further guarantee the effects of the conditional expression (17), the lower limit value of the conditional expression (17) is preferably set to be 8.0°.

The zoom optical system ZL according to the present embodiment preferably has at least an aspherical lens surface in the fifth lens group G5. With this configuration, high-order spherical aberrations, coma aberrations, and curvature of field can be successfully corrected.

The zoom optical system ZL according to the present embodiment is preferably configured to perform correction (vibration isolation) on the position of the image when image shake has occurred by moving at least some of the first lens group G1, the second lens group G2, the third lens group G3, the fourth lens group G4, and the fifth lens group G5 to have a displacement component in the direction orthogonal to the optical axis. Any one of the lens groups may be moved to have a displacement component in the direction orthogonal to the optical axis, or a part of the lenses or lens groups in any one of the lens groups may be moved to have a displacement component in the direction orthogonal to the optical axis.

The zoom optical system ZL according to the present embodiment is preferably configured to perform correction (vibration isolation) on the position of the image when image shake has occurred by moving at least apart of the fourth lens group G4 to have a displacement component in the direction orthogonal to the optical axis. Making a negative lens group with a low beam height, such as the fourth lens group G4, function as a vibration-proof lens group can achieve a small size of the lens outer diameter. Furthermore, by positioning the vibration-proof lens group around halfway between an aperture stop S and an image surface I, a beam change can be reduced while correcting the position of the image when image shake has occurred and variation of aberrations in image shake correction can also be reduced.

The zoom optical system ZL according to the present embodiment may perform correction (vibration isolation) on the position of the image when image shake has occurred by moving one of the fourth-A lens group G4A having negative refractive power and the fourth-B lens group G4B having negative refractive power, which are included in the fourth lens group G4, to have a displacement component in the direction orthogonal to the optical axis. With this configuration, various aberrations in positive refractive power components in the third lens group G3 and the fifth lens group G5 during image surface correction when image shake has occurred can be corrected by various aberrations in negative refractive power components in the lens group included in the fourth lens group G4 that is not vibration-proof, resulting in successful correction of aberrations during image surface correction when image shake has occurred.

In the zoom optical system ZL according to the present embodiment, the third lens group G3 and the fifth lens group G5 preferably move toward the object upon zooming from the wide angle end state to the telephoto end state with the same movement amount with respect to the image surface I. With this configuration, the third lens group G3 and the fifth lens group G5 can be integrated, mutual decentering change can be reduced upon zooming from the wide angle end state to the telephoto end state, and deterioration of optical performance due to manufacturing errors can be mitigated.

The zoom optical system ZL according to the present embodiment is preferably configured to move at least a part of the second lens group G2 along the optical axis upon focusing on a short distance object. With this configuration, variation of spherical aberrations and curvature of field upon focusing can be reduced while achieving a reduced outer diameter and lighter weight of the focusing groups.

The zoom optical system ZL according to the present embodiment preferably has at least an aspherical lens surface in the fourth lens group G4. With this configuration, high-order spherical aberrations and coma aberrations can be successfully corrected.

The zoom optical system ZL according to the present embodiment preferably has at least an aspherical lens surface in the second lens group G2. With this configuration, high-order curvature of field and coma aberrations can be successfully corrected.

In the zoom optical system ZL according to the present embodiment, at least one optical surface in the lens group closest to the image with respect to the first lens group G1 is provided with an antireflection film. The antireflection film includes at least one layer with nd of 1.30 or less where nd denotes the refractive index with respect to the d line (wavelength $\lambda$=587.6 nm). With this configuration, the difference in refractive index between the layer with a refractive index nd of 1.30 or less and the air can be reduced, resulting in less reflection of light to achieve an excellent imaging performance with reduced ghosting and flare.

The zoom optical system ZL according to the present embodiment preferably includes an aperture stop, and the optical surface provided with the antireflection film is a concave lens surface as seen from the aperture stop. The concave lens surface as seen from the aperture stop among the optical surfaces in the lens group closest to the image with respect to the first lens group G1 is likely to cause light reflection. To address this, the antireflection film is provided to the lens surface so that ghosting and flare can be effectively reduced.

In the zoom optical system ZL according to the present embodiment, the concave lens surface as seen from the aperture stop is preferably a lens surface facing the object among the lenses in the first lens group G1. The concave lens surface as seen from the aperture stop among the optical surfaces in the first lens group G1 is likely to cause light reflection. To address this, the antireflection film is provided to the lens surface so that ghosting and flare can be effectively reduced.

In the zoom optical system ZL according to the present embodiment, the concave lens surface as seen from the aperture stop is preferably a lens surface facing the image among the lenses in the first lens group G1. The concave lens surface as seen from the aperture stop among the optical surfaces in the first lens group G1 is likely to cause light reflection. To address this, the antireflection film is provided to the lens surface so that ghosting and flare can be effectively reduced.

In the zoom optical system ZL according to the present embodiment, the concave lens surface as seen from the aperture stop is preferably a lens surface facing the object among the lenses in the lens group closest to the image. The concave lens surface as seen from the aperture stop among the optical surfaces in the lens group closest to the image is likely to cause light reflection. To address this, the antireflection film is provided to the lens surface so that ghosting and flare can be effectively reduced.

In the zoom optical system ZL according to the present embodiment, the concave lens surface as seen from the aperture stop is preferably a lens surface facing the image among the lenses in the lens group closest to the image. The concave lens surface as seen from the aperture stop among the optical surfaces in the lens group closest to the image is likely to cause light reflection. To address this, the antireflection film is provided to the lens surface so that ghosting and flare can be effectively reduced.

In the zoom optical system ZL according to the present embodiment, the optical surface provided with the antireflection film is a concave lens surface as seen from the image side. The concave lens surface as seen from the image side among the optical surfaces in the lens group closest to the image and the first lens group G1 is likely to cause light reflection. To address this, the antireflection film is provided to the lens surface so that ghosting and flare can be effectively reduced.

In the zoom optical system ZL according to the present embodiment, the concave lens surface as seen from the image side is preferably a lens surface facing the object among the lenses in the lens group closest to the image. The concave lens surface as seen from the image side among the optical surfaces in the lens group closest to the image is likely to cause light reflection. To address this, the antireflection film is provided to the lens surface so that ghosting and flare can be effectively reduced.

In the zoom optical system ZL according to the present embodiment, the concave lens surface as seen from the image side is preferably a lens surface facing the image among the lenses in the lens group closest to the image. The concave lens surface as seen from the image side among the optical surfaces in the lens group closest to the image is likely to cause light reflection. To address this, the antireflection film is provided to the lens surface so that ghosting and flare can be effectively reduced.

In the zoom optical system ZL according to the present embodiment, the optical surface provided with the antireflection film is preferably a concave lens surface as seen from the object. The concave lens surface as seen from the object among the optical surfaces in the lens group closest to the image with respect to the first lens group G1 is likely to cause light reflection. To address this, the antireflection film is provided to the lens surface so that ghosting and flare can be effectively reduced.

In the zoom optical system ZL according to the present embodiment, the concave lens surface as seen from the object is preferably a lens surface facing the image among the lenses in the first lens group G1. The concave lens surface as seen from the object among the optical surfaces in the first lens group G1 is likely to cause light reflection. To address this, the antireflection film is provided to the lens surface so that ghosting and flare can be effectively reduced.

In the zoom optical system ZL according to the present embodiment, the antireflection film is preferably a multi-layered film, and the outermost layer of the multi-layered film is the layer with a refractive index nd of 1.3 or less. With this configuration, the difference in refractive index between the layer with a refractive index nd of 1.30 or less and the air can be reduced, resulting in less reflection of light to reduce ghosting and flare.

The antireflection film in the zoom optical system ZL according to the present embodiment may be formed by a wet process, a dry process, or the like. In the case of the dry process, the antireflection film preferably includes at least one layer with a refractive index nd of 1.30 or less. With this configuration, even when the antireflection film is formed by the dry process or the like, the same effects can be achieved as with the antireflection film formed by the wet process. The layer with a refractive index nd of 1.30 or less is preferably the outermost layer of the multi-layered film.

While the conditions and configurations described above are designed to exert the above-described effects, the embodiment does not necessarily satisfy all the conditions and configurations. The above-described effects can be achieved by any of the conditions and configurations or by a combination of any of the conditions and configurations.

Figure 16:
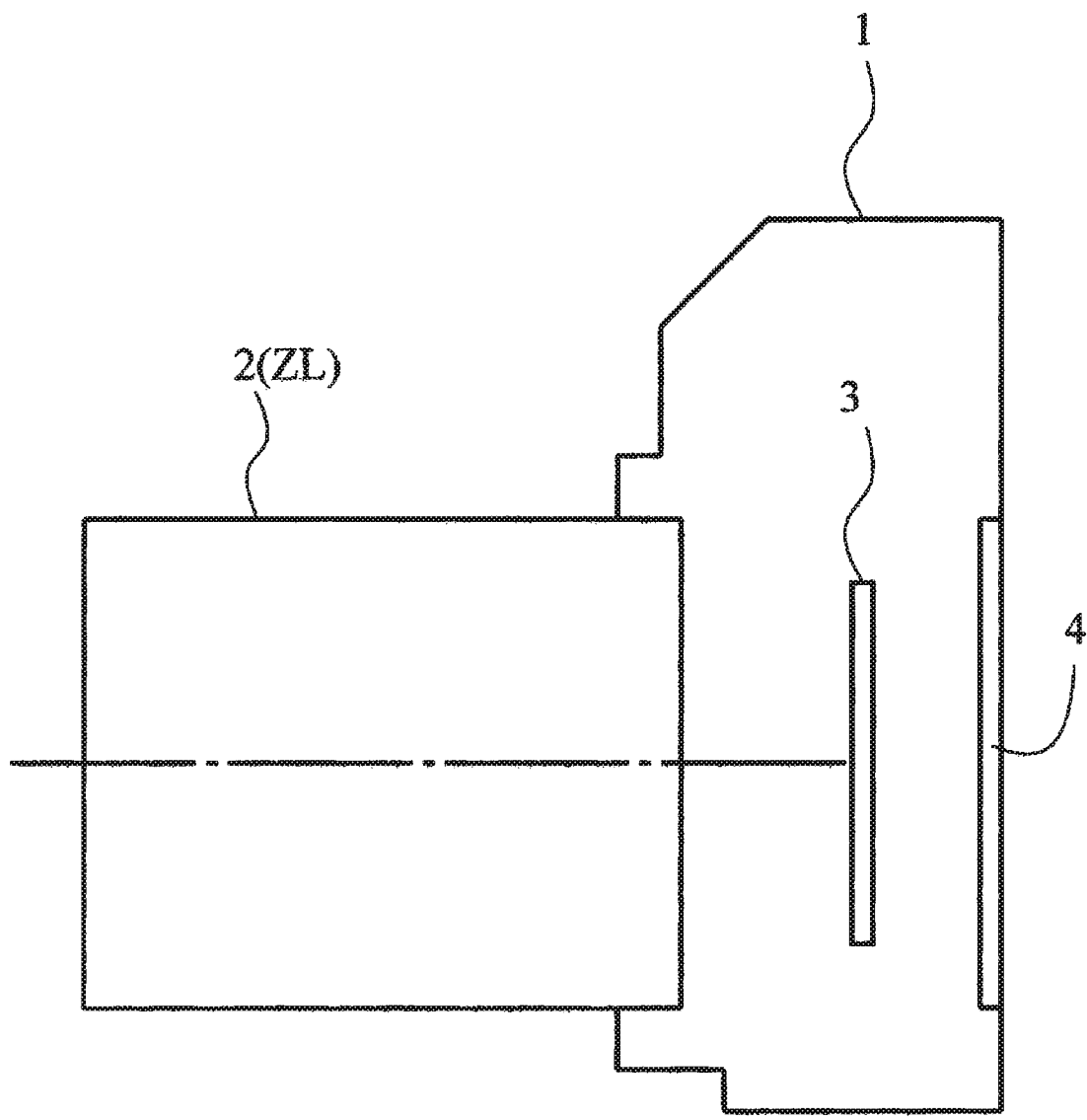
FIG. 16 is a cross-sectional view of a camera including the zoom optical system.

Next, a camera that is an optical device including the zoom optical system ZL according to the present embodiment is described with reference to FIG. 16. This camera 1 is what is known as a mirrorless camera that is a lens interchangeable camera and includes the zoom optical system ZL according to the present embodiment serving as an imaging lens 2. In the camera 1, the imaging lens 2 collects light from an object (subject) (not illustrated) and a subject image is formed on an imaging surface of an imaging unit 3 through an optical low pass filter (OLPF) (not illustrated). A photoelectric conversion element included in the imaging unit 3 performs photoelectric conversion of the subject image to form an image of the subject. This image is displayed on an electronic view finder (EVF) 4 included in the camera 1. In this manner, the photographer can observe the subject through the EVF 4.

When the photographer presses a release button (not illustrated), the image photoelectrically converted by the imaging unit 3 is stored in a memory (not illustrated). In this manner, the photographer can capture an image of the subject with the camera 1. While a mirrorless camera is taken as an example in the present embodiment, the same effects as with the camera 1 can be achieved when the zoom optical system ZL according to the present embodiment is installed in a single lens reflex camera that includes a quick return mirror in a camera body and captures an image of a subject through a finder optical system.

The following configurations can be appropriately employed without compromising the optical performance.

The configurations of the zoom optical system ZL with the five and six groups are described in the present embodiment. However, this should not be construed in a limiting sense, and the present invention can be applied to a configuration with other number of groups, such as seven or eight groups or the like. A configuration further provided with a lens or a lens group closest to an object or further provided with a lens or a lens group closest to the image may be employed. More specifically, a lens group the position of which facing the image surface is fixed upon zooming or focusing may be added to the side closest to the image surface. The lens group is a portion including at least one lens separated from another lens with a distance varying upon zooming or focusing. In the zoom optical system ZL according to the embodiment, the first lens group G1 to the fifth lens group G5 move along the optical axis to change the distances between the groups upon zooming. A lens component refers to a cemented lens in which a single lens or a plurality of lenses are cemented.

By moving a single or a plurality of lens groups or a partial lens group in the optical axis direction, a focusing lens group may be provided that performs focusing from an infinite distant object to a short distance object. In this case, the focus lens group can be applied to auto focus, and is suitable for motor driving for auto focus (for supersonic wave motors, etc.). In particular, at least a part of the second lens group G2 is preferably a focusing lens group, and the positions of the other lenses are fixed with respect to the image surface upon focusing. The focusing lens group preferably includes a single lens in terms of load on the motor.

The lens groups may be entirely or partially moved with a displacement component in a direction orthogonal to the optical axis, or may be moved and rotated (swing) within an in-plane direction including the optical axis, to serve as a vibration-proof lens group for correcting image blur due to camera shake or the like. As described above, at least a part of the fourth lens group G4 is especially preferably used as the vibration-proof lens group.

The lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage in that rendering performance is not largely compromised even when the image surface is displaced. The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

The aperture stop S is preferably disposed in the neighborhood of or within the third lens group G3. Alternatively, a lens frame may serve as the aperture stop so that the member serving as the aperture stop needs not to be provided.

The lens surfaces may be provided with an antireflection film featuring high transmittance over a wide range of wavelengths to achieve an excellent optical performance with reduced flare and ghosting and increased contrast.

The zoom optical system ZL according to the present embodiment has zooming rates of about 3 to 10 times.

Figure 17:
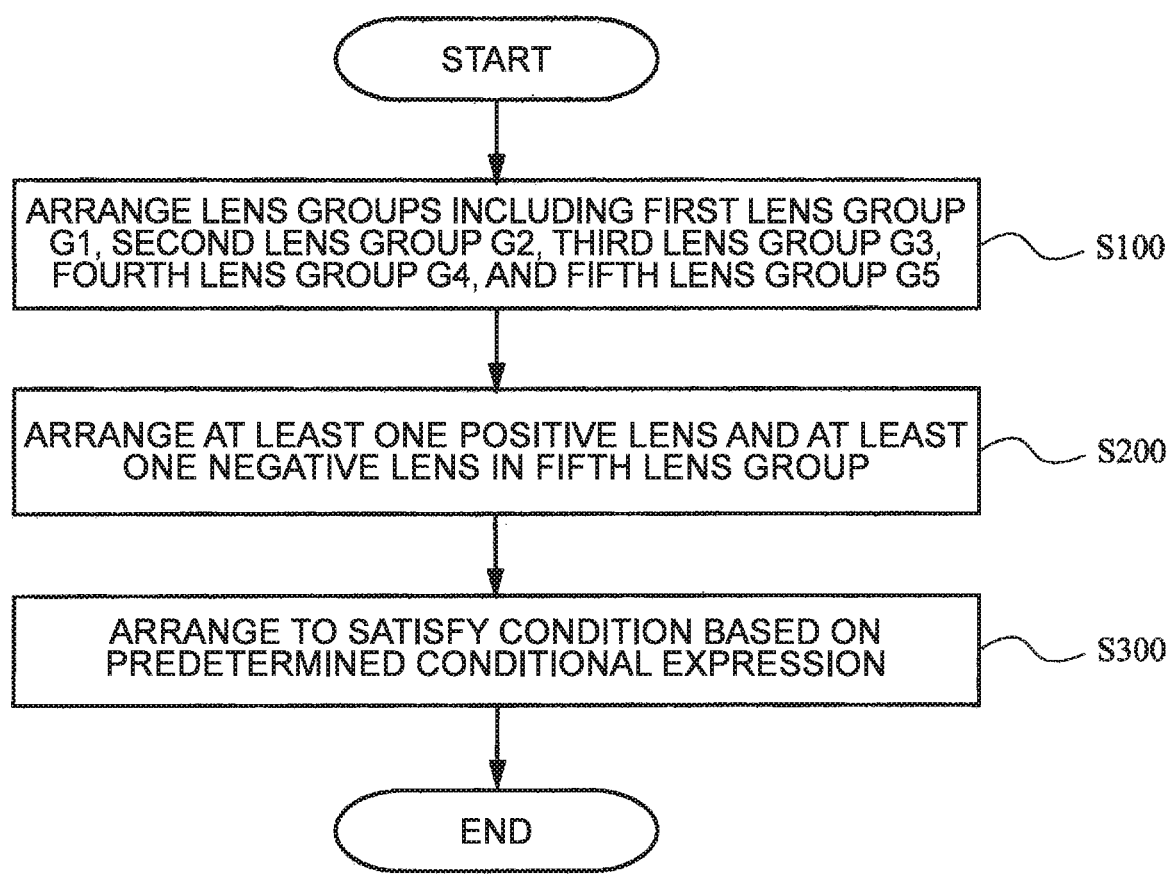
FIG. 17 is a flowchart for describing a method for manufacturing the zoom optical system.

Next, a method for manufacturing the zoom optical system ZL according to the present embodiment is schematically described with reference to FIG. 17. First, the lenses are arranged to prepare the first lens group G1, the second lens group G2, the third lens group G3, the fourth lens group G4, and the fifth lens group G5, and upon zooming from the wide angle end state to the telephoto end state, the lens groups G1 to G5 are moved along the optical axis to change a distance between the lens groups G1 to G5 (step S100). In the fifth lens group G5, at least one positive lens and at least one negative lens are arranged (step S200). The lenses are arranged in such a manner that the above-described conditions (for example, conditional expressions (1) and (2)) are satisfied (step S300).

More specifically, in the present embodiment, as illustrated in FIG. 1, for example, in order from the object, the first lens group G1 includes: a cemented lens including a negative meniscus lens L11 having a convex surface facing the object and a biconvex lens L12, and a positive meniscus lens L13 having a convex surface facing the object; the second lens group G2 includes: a negative meniscus lens L21 having a convex surface facing the object provided with a resin layer to form an aspherical surface, a biconcave lens L22, a biconvex lens L23, and a negative meniscus lens L24 having a concave surface facing the object; the third lens group G3 includes: an aperture stop S, a biconvex lens L31, a cemented lens including a biconvex lens L32 and a negative meniscus lens L33 having a concave surface facing the object, and a biconvex lens L34; the fourth lens group G4 includes a cemented lens including a biconcave negative lens L41 having an aspherical surface on the lens surface facing the object and a positive meniscus lens L42 having a convex surface facing the object, and a negative meniscus lens L43 having a concave surface facing the object; and the fifth lens group G5 includes a plano-convex lens L51 having a planar surface facing the object, and a cemented lens including a biconvex lens L52 and a negative lens L53 having a negative meniscus lens shape having an aspherical shape on the lens surface facing the image. The zoom optical system ZL is manufactured by arranging the lens groups thus prepared in the manner described above.

With the configuration described above, the zoom optical system ZL that is compact and has high optical performance, and an optical device including the zoom optical system ZL and a method for manufacturing the zoom optical system ZL can be provided.

EXAMPLES

Figure 6:
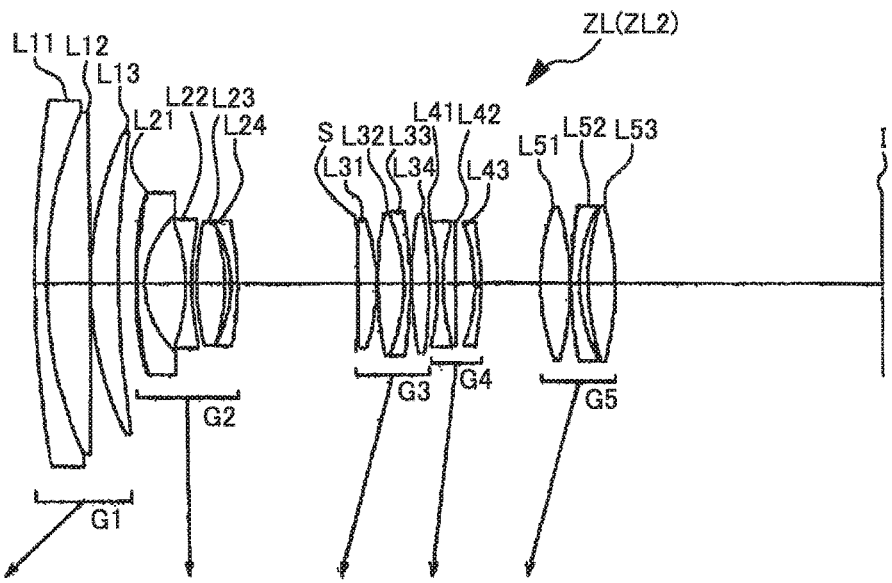
FIG. 6 is a cross-sectional diagram illustrating a lens configuration of a zoom optical system according to Example 2.
Figure 6:
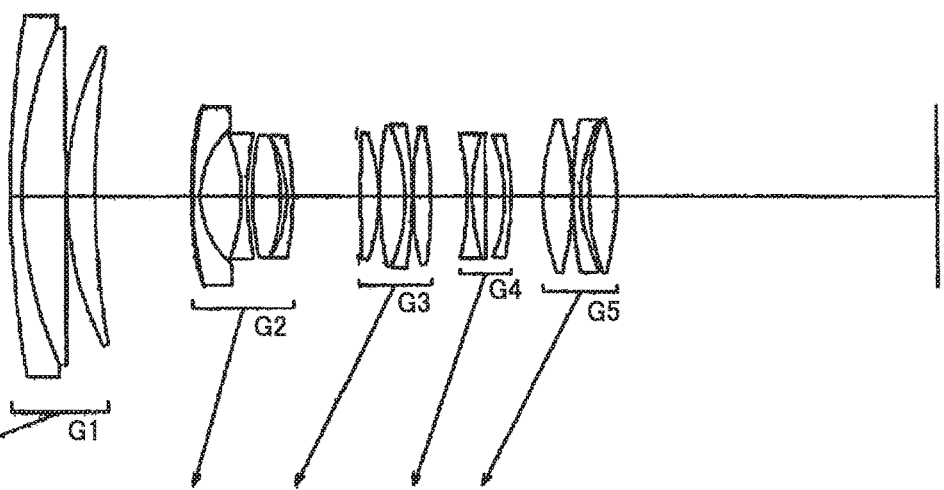
Figure 6:
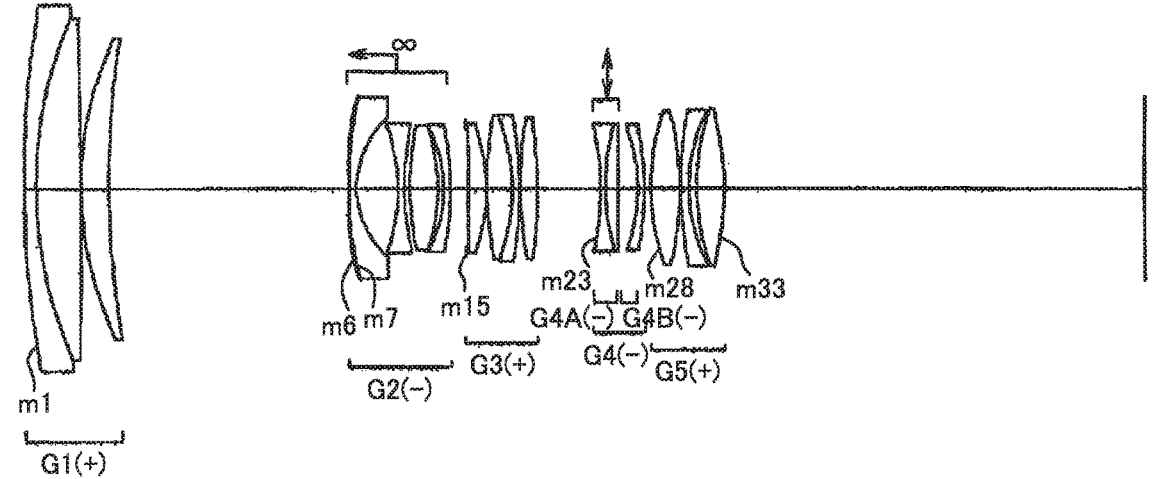
Figure 11:
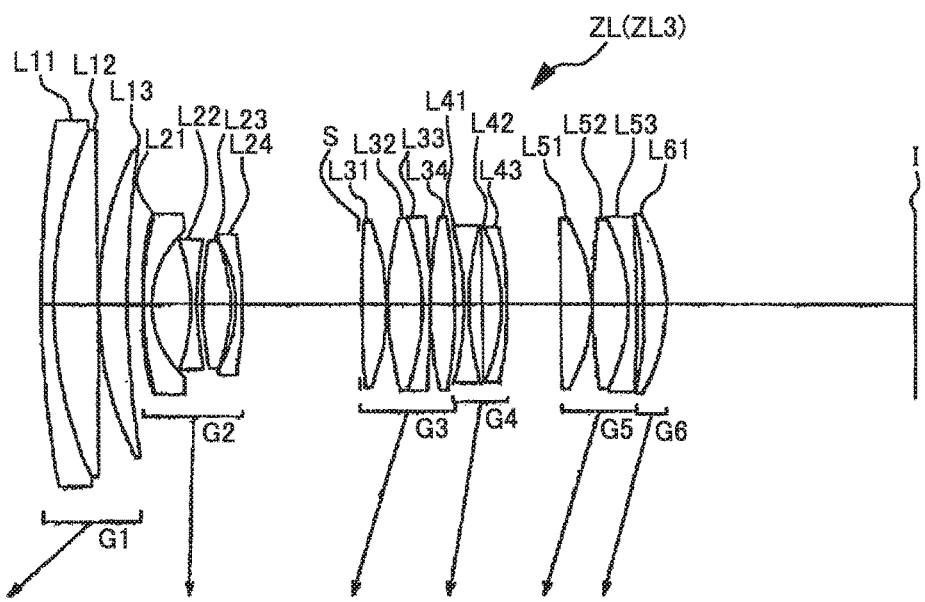
FIG. 11 is a cross-sectional diagram illustrating a lens configuration of a zoom optical system according to Example 3.
Figure 11:
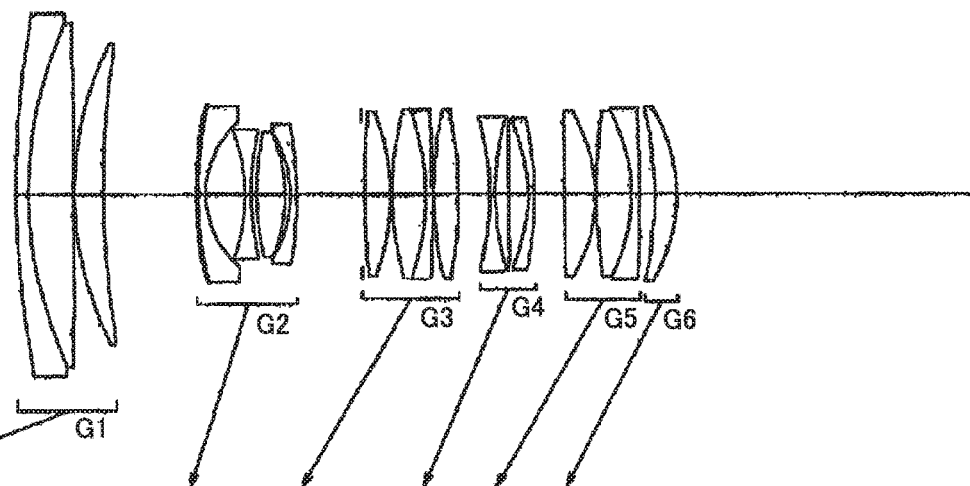
Figure 11:
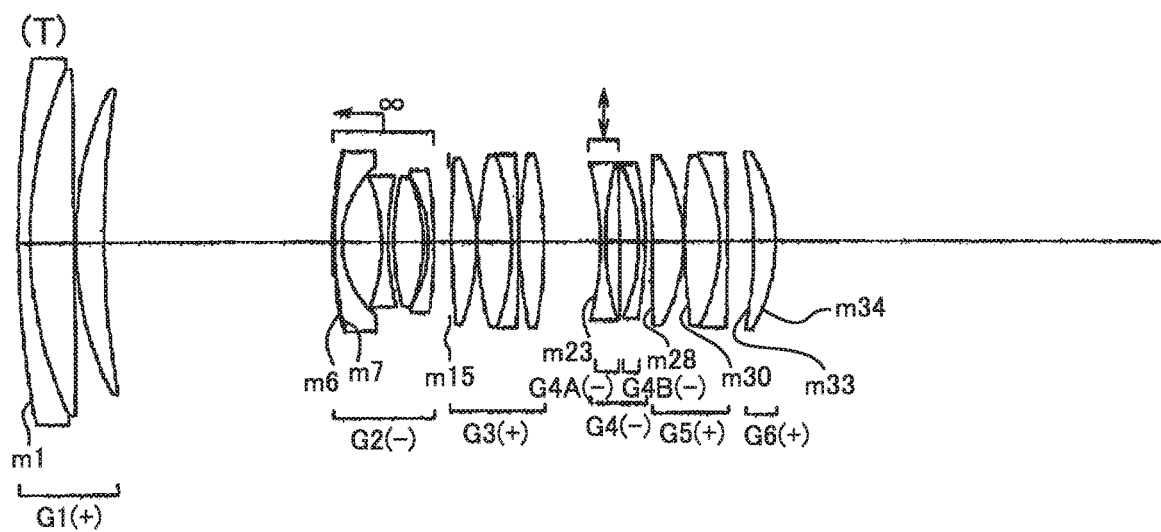

Examples according to the present application are described with reference to the drawings. FIG. 1, FIG. 6, and FIG. 11 are cross-sectional views illustrating configurations and refractive power distributions of the zoom optical system ZL (ZL1 to ZL3) according to Examples. In the lower portion of each cross-sectional view of the zoom optical systems ZL1 to ZL3, the directions in which the lens groups G1 to G5 (or G6) are moved along the optical axis upon zooming from the wide angle end state (W) via the intermediate focal length state (M) to the telephoto end state (T) are shown by arrows.

In each Example, the aspherical surface is represented by the following equation (a) where y denotes a height in the direction orthogonal to the optical axis, S (y) denotes a distance (sag amount) along the optical axis from a tangential plane of a vertex of the aspherical surface at the height y to the aspherical surface, r denotes a radius of curvature (paraxial radius of curvature) of a reference spherical surface, a conical coefficient K, and $A_n$ denotes an n-th aspherical coefficient. In the following Examples, "E-n" indicates "$\times 10^{-n}$".

$$S(y)=(y^2/r)/\{1+(1-Kxy^2/r^2)^{1/2}\}+A4xy^4+A6xy^6+A8\times y^8+A10xy^{10}+A12xy^{12} \quad (a)$$

In each Example, a secondary aspherical coefficient A2 is 0. In Tables of Examples, the aspherical surface is denoted by * on the right side of the surface number.

Example 1

FIG. 1 is a diagram illustrating the configuration of the zoom optical system ZL1 according to Example 1. The zoom optical system ZL1 illustrated in FIG. 1 has a configuration including: a first lens group G1 having positive refractive power; a second lens group G2 having negative refractive power; a third lens group G3 having positive refractive power; a fourth lens group 4G having negative refractive power; and a fifth lens group G5 having positive refractive power that are disposed in order from an object. In the zoom optical system ZL1, the first lens group G1 includes: a cemented lens including a negative meniscus lens L11 having a convex surface facing the object and a biconvex lens L12; and a positive meniscus lens L13 having a convex surface facing the object that are disposed in order from an object. The second lens group G2 includes: a negative meniscus lens L21 having a convex surface facing the object provided with a resin layer on the lens surface facing the object to form an aspherical surface; a biconcave lens L22; a biconvex lens L23; and a negative meniscus lens L24 having a concave surface facing the object that are disposed in order from the object. The third lens group G3 includes: a biconvex lens L31; a cemented lens including a biconvex lens L32 and a negative meniscus lens L33 having a concave surface facing the object; and a biconvex lens L34 that are disposed in order from the object. The fourth lens group G4 includes: a fourth-A lens group G4A having negative refractive power and including a cemented lens including a negative biconcave lens L41 having an aspherical lens surface facing the object and a positive meniscus lens L42 having a convex surface facing the object; and a fourth-B lens group G4B having negative refractive power and including a negative meniscus lens L43 having a concave surface facing the object that are disposed in order from the object. The fifth lens group G5 includes: a plano-convex lens L51 having a planar surface facing the object, and a cemented lens including a biconvex lens L52 and a negative meniscus lens L53 having an aspherical lens surface facing the image that are disposed in order from the object. An aperture stop S is provided adjacent to and more on the object side than the third lens group G3. The negative lens L41 and the negative lens L53 are glass-molded aspherical lenses.

In the zoom optical system ZL1, upon zooming from a wide angle end state to a telephoto end state, the lens groups are configured to be moved toward the object along the optical axis to increase a distance between the first lens group G1 and the second lens group G2, decrease a distance between the second lens group G2 and the third lens group G3, increase a distance between the third lens group G3 and the fourth lens group G4, and decrease a distance between the fourth lens group G4 and the fifth lens group G5. The aperture stop S integrally moves with the third lens group G3. The third lens group G3 and the fifth lens group G5 are configured to move with the same movement amount with respect to the image surface.

The zoom optical system ZL1 is configured to perform focusing from infinity to a short-distant object by moving the second lens group G2 toward the object.

The zoom optical system ZL1 is configured to perform correction (vibration isolation) on the position of the image when image shake has occurred by moving the fourth-A lens group G4A in the fourth lens group G4 to have a displacement component in the direction orthogonal to the optical axis. To correct roll blur of an angle θ with a lens having a focal length f of the whole system and a vibration proof coefficient K (the ratio of the image movement amount on the imaging surface to the movement amount of the fourth-A lens group G4A in correction of the image position when image shake has occurred), the fourth-A lens group G4A, which is a vibration-proof lens group, is moved in the direction orthogonal to the optical axis by (f·tan θ)/K (the same applies to Examples below). In the wide angle end state in Example 1, the vibration proof coefficient is −0.65 and the focal length is 16.49 (mm), and thus the movement amount of the fourth-A lens group G4A to correct a roll blur of 0.50° is −0.22 (mm). In the intermediate focal length state in Example 1, the vibration proof coefficient is −0.79 and the focal length is 35.00 (mm), and thus the movement amount of the fourth-A lens group G4A to correct a roll blur of 0.50° is −0.39 (mm). In the telephoto end state in Example 1, the vibration proof coefficient is −0.99 and the focal length is 77.79 (mm), and thus the movement amount of the fourth-A lens group G4A to correct a roll blur of 0.50° is −0.68 (mm).

Table 1 below lists specification values of the zoom optical system ZL1. In Table 1, among the specifications, f denotes the focal length of the whole system, FNO denotes an F number, ω denotes a half angle of view, Y denotes a maximum image height, TL denotes a total length, and BF denotes a value of back focus in each of the wide angle end state, the intermediate focal length state, and the telephoto end state. The total length TL represents the distance from the lens surface (first surface in FIG. 1) closest to the object upon focusing on infinity to the image surface I on the optical axis. The back focus BF represents the distance (air equivalent length) from the lens surface (32nd surface in FIG. 1) closest to the image surface upon focusing on infinity to the image surface I on the optical axis. In the lens data, the first column m represents the order (surface number) of lens surfaces from the object side along the direction in a traveling direction of a light beam, the second column r represents a radius of curvature of each lens surface, the third column d represents a distance (surface distance) between each optical surface and the next optical surface on the optical axis, and the fourth column nd and the fifth column vd represent a refractive index and an Abbe number of the material based on the d line (λ=587.6 nm). A radius of curvature 0.000 indicates a flat surface, and a refractive index of air 1.00000 is not mentioned. Surface numbers 1 to 32 listed in Table 1 correspond to numbers m1 to m32 in FIG. 1 (FIG. 1 shows a part of the surface numbers). The focal lengths of the lens groups indicate focal lengths from the respective starting surfaces of the first lens group G1 to the fifth lens group G5.

The focal length f, the radius of curvature r, the surface distance d, and the other units of length described below as the specification values, which are generally described with "mm" unless otherwise noted should not be construed in a limiting sense because the optical system proportionally expanded or reduced can have similar or the same optical performance. The description on the numerals and the specification lists similarly applies to the other Examples.

TABLE 1

Example 1

[Overall specifications]

|     |   | Wide angle end state |   | Intermediate focal length state |   | Telephoto end state |
|-----|---|---|---|---|---|---|
| f   | = | 16.49 | ~ | 35.00 | ~ | 77.79 |
| FNo | = | 2.72  | ~ | 3.38  | ~ | 4.16  |
| ω   | = | 43.2  | ~ | 22.0  | ~ | 10.4  |
| Y   | = | 14.75 | ~ | 14.75 | ~ | 14.75 |
| TL  | = | 130.371 | ~ | 146.181 | ~ | 171.571 |
| BF  | = | 37.994 | ~ | 49.378 | ~ | 63.528 |
| BF(air equivalent length) | = | 37.994 | ~ | 49.378 | ~ | 63.528 |

TABLE 1-continued

Example 1

[Lens data]

| m | r | d | nd | vd |
|---|---|---|----|----|
| Object surface | ∞ | | | |
| 1 | 142.08408 | 1.800 | 1.84666 | 23.8 |
| 2 | 61.98900 | 6.800 | 1.59319 | 67.9 |
| 3 | 2234.55748 | 0.100 | | |
| 4 | 54.61907 | 4.400 | 1.81600 | 46.6 |
| 5 | 160.87634 | D5 | | |
| 6* | 111.35036 | 0.200 | 1.56093 | 36.6 |
| 7 | 74.66256 | 1.200 | 1.81600 | 46.6 |
| 8 | 13.29818 | 6.450 | | |
| 9 | −26.94042 | 1.000 | 1.81600 | 46.6 |
| 10 | 41.14663 | 0.800 | | |
| 11 | 38.15106 | 4.500 | 1.84666 | 23.8 |
| 12 | −28.49989 | 0.500 | | |
| 13 | −21.99346 | 1.000 | 1.88300 | 40.7 |
| 14 | −53.69291 | D14 | | |
| 15 | 0.00000 | 1.600 | | Aperture stop S |
| 16 | 237.40240 | 3.500 | 1.54814 | 45.8 |
| 17 | −29.52544 | 0.150 | | |
| 18 | 41.68613 | 4.200 | 1.51742 | 52.2 |
| 19 | −26.94900 | 1.100 | 1.90200 | 25.3 |
| 20 | −425.16586 | 0.100 | | |
| 21 | 37.61777 | 2.850 | 1.49782 | 82.6 |
| 22 | −64.06628 | D22 | | |
| 23* | −69.82119 | 0.800 | 1.79050 | 45.0 |
| 24 | 24.82010 | 2.000 | 1.90200 | 25.3 |
| 25 | 100.53108 | 2.550 | | |
| 26 | −22.07831 | 1.000 | 1.81600 | 46.6 |
| 27 | −33.57787 | D27 | | |
| 28 | 0.00000 | 4.600 | 1.49782 | 82.6 |
| 29 | −20.99670 | 0.100 | | |
| 30 | 71.45078 | 6.100 | 1.49782 | 82.6 |
| 31 | −20.04840 | 1.200 | 1.88202 | 37.2 |
| 32* | −55.06437 | BF | | |
| Image surface | ∞ | | | |

[Focal lengths of lens groups]

| Lens group | Starting surface | Focal length |
|---|---|---|
| First lens group | 1 | 86.49 |
| Second lens group | 6 | −13.10 |
| Third lens group | 15 | 24.85 |
| Fourth lens group | 23 | −35.11 |
| Fifth lens group | 28 | 36.01 |

In the zoom optical system ZL1, 6th, 23rd, and 32nd surfaces have aspherical shapes. Table 2 lists aspherical data, that is, a conical coefficient K and aspherical coefficients A4 to A12.

TABLE 2

[Aspherical data]

| A4 | A6 | A8 | A10 | A12 |
|---|---|---|---|---|
| 6th surface K = 1.00000e+00 | | | | |
| 1.91866e−05 | −3.07743e−08 | −1.44905e−10 | 1.15106e−12 | −1.98690e−15 |
| 23rd surface K = 1.00000e+00 | | | | |
| 3.75789e−06 | −1.80254e−08 | 0.00000e+00 | 0.00000e+00 | 0.00000e+00 |
| 32nd surface K = 1.00000e+00 | | | | |
| 7.46360e−06 | 8.05331e−09 | −4.65179e−11 | 2.16314e−13 | 0.00000e+00 |

In the zoom optical system ZL1, the axial distance D5 between the first lens group G1 and the second lens group G2, the axial distance D14 between the second lens group G2 and the third lens group G3 (aperture stop S), the axial distance D22 between the third lens group G3 and the fourth lens group G4, the axial distance D27 between the fourth lens group G4 and the fifth lens group G5, and the back focus BF are changed upon zooming as described above. Table 3 below lists variable distances in each focal length state of the wide angle end state (W), the intermediate focal length state (M), and the telephoto end state (T) in the focusing-on-infinity state and the focusing-on-a-short-distant-object state. D0 denotes the distance from the surface (first surface) closest to the object in the zoom optical system ZL1 to the object, and β denotes a magnification (the same applies to Examples below).

TABLE 3

[Variable distance data]

|     | Infinity | | | Short distance | | |
| --- | --- | --- | --- | --- | --- | --- |
|     | W | M | T | W | M | T |
| D0  | ∞ | ∞ | ∞ | 219.63 | 203.82 | 178.43 |
| β   | — | — | — | −0.0648 | −0.1260 | −0.2249 |
| f   | 16.49 | 35.00 | 77.79 | — | — | — |
| D5  | 2.100 | 17.730 | 35.502 | 0.885 | 15.776 | 31.579 |
| D14 | 18.846 | 7.642 | 1.110 | 20.061 | 9.596 | 5.033 |
| D22 | 1.434 | 6.306 | 9.411 | 1.434 | 6.306 | 9.411 |
| D27 | 9.397 | 4.525 | 1.420 | 9.397 | 4.525 | 1.420 |
| BF  | 37.994 | 49.378 | 63.528 | 37.994 | 49.378 | 63.528 |

Next, Table 4 lists conditional expression corresponding values in the zoom optical system ZL1. In Table 4, fw denotes the focal length of the whole system in the wide angle end state, ft denotes the focal length of the whole system in the telephoto end state, f1 denotes the focal length of the first lens group G1, f2 denotes the focal length of the second lens group G2, f3 denotes the focal length of the third lens group G3, f4 denotes the focal length of the fourth lens group G4, f5w denotes the composite focal length of the optical system on the image side including the fifth lens group G5 in the wide angle end state, ωw denotes a half angle of view in the wide angle end state, ωt denotes a half angle of view in the telephoto end state, FNw denotes the F number of the whole system in the wide angle end state, FNt denotes the F number of the whole system in the telephoto end state, N2max denotes a maximum absolute value of the refractive index with respect to the d line of the lens medium in the second lens group G2, N3n denotes an average refractive index with respect to the d line of all the negative lens media in the third lens group G3, N3p denotes an average refractive index with respect to the d line of all the positive lens media in the third lens group G3, N5n denotes an average refractive index with respect to the d line of all the negative lens media in the fifth lens group G5, and N5p denotes an average refractive index with respect to the d line of all the positive lens media in the fifth lens group G5. The description on the numerals similarly applies to the other Examples described below.

TABLE 4 f5w = 36.01
[Conditional expression corresponding values]

(1)(−f4)/f5w = 0.975
(2)FNw = 2.722
(3)N5n − N5p = 0.384

TABLE 4-continued f5w = 36.01
[Conditional expression corresponding values]

(4)N5n = 1.882
(5)ft/fw = 4.717
(6)FNt = 4.160
(7)f1/f3 = 3.480
(8)f2/f4 = 0.371
(9)N2max = 1.883
(10)fw/f3 = 0.664
(11)fw/(−f4) = 0.470
(12)ft/f3 = 3.130
(13)ft/(−f4) = 2.216
(14)N3n − N3p = 0.381
(15)N3n = 1.902
(16)ωw = 43.244
(17)ωt = 10.411

In this manner, the zoom optical system ZL1 satisfies all the conditional expressions (1) to (17) described above.

Figure 2A:
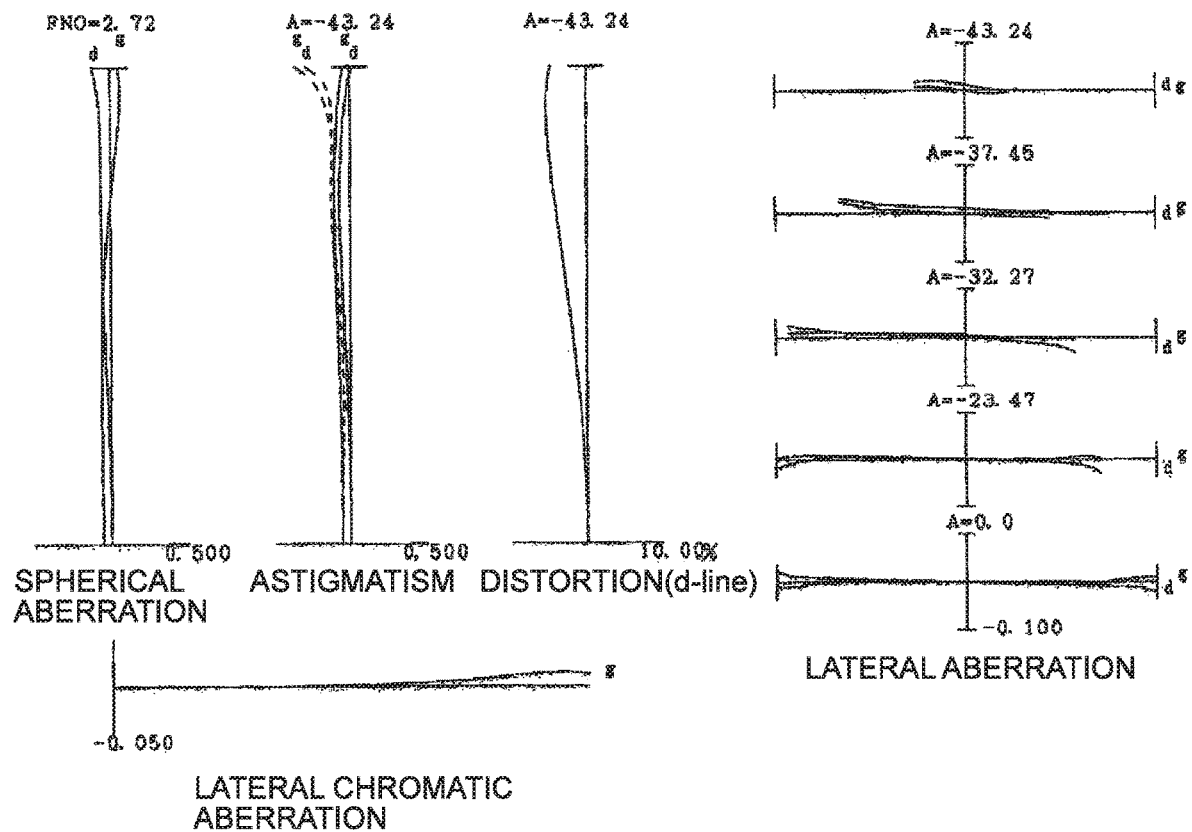
FIGS. 2A and 2B are various aberration graphs of the zoom optical system in a wide angle end state according to Example 1, FIG. 2A being a various aberration graph in a focusing-on-infinity state, FIG. 2B being a lateral aberration graph in the focusing-on-infinity state with image shake correction performed.
Figure 2B:
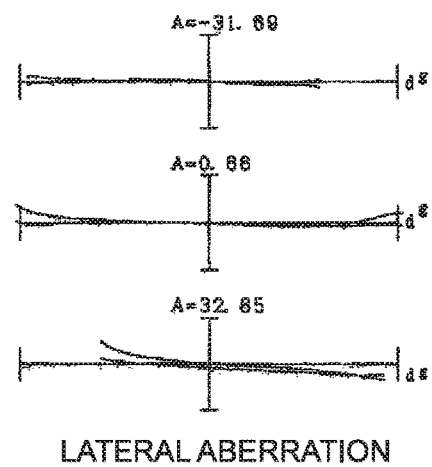
Figure 3A:
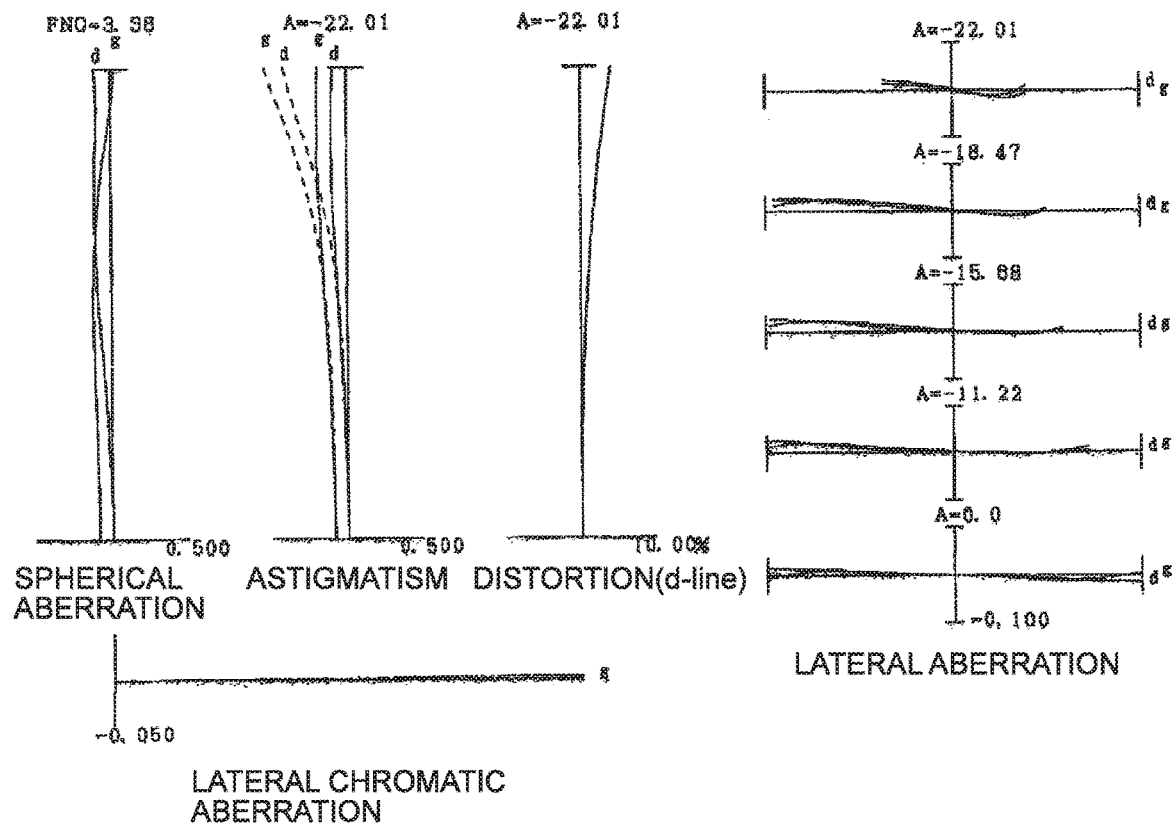
FIGS. 3A and 3B are various aberration graphs of the zoom optical system in an intermediate focal length state according to Example 1, FIG. 3A being a various aberration graph in the focusing-on-infinity state, FIG. 3B being a lateral aberration graph in the focusing-on-infinity state with image shake correction performed.
Figure 3B:
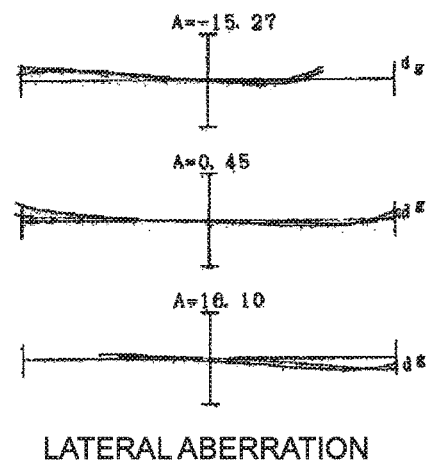
Figure 4A:
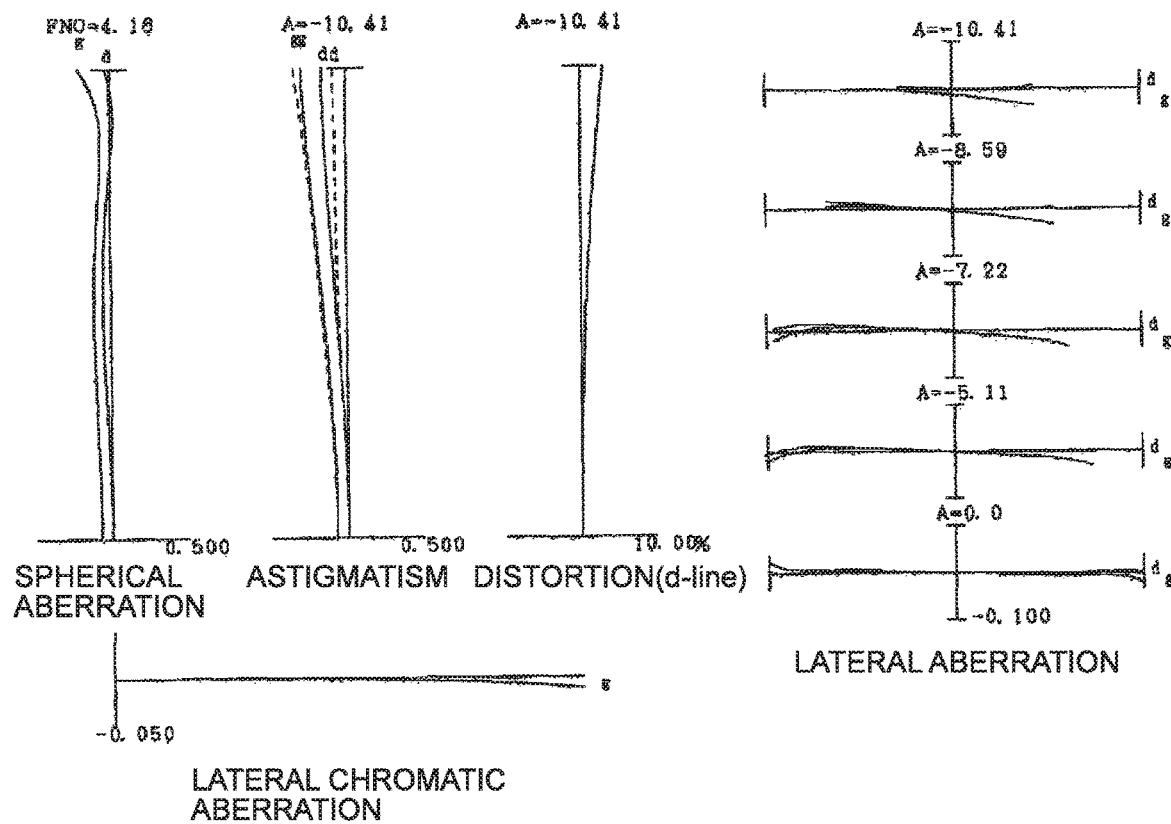
FIGS. 4A and 4B are various aberration graphs of the zoom optical system in a telephoto end state according to Example 1, FIG. 4A being a various aberration graph in the focusing-on-infinity state, FIG. 4B being a lateral aberration graph in the focusing-on-infinity state with image shake correction performed.
Figure 4B:
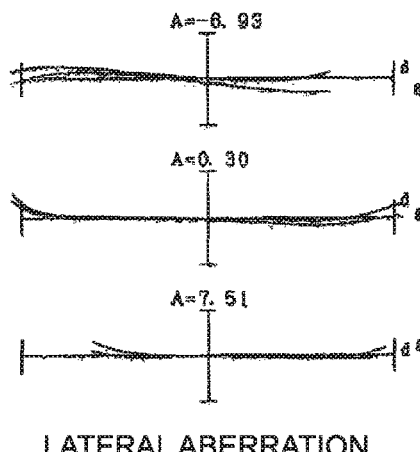
Figure 5A:
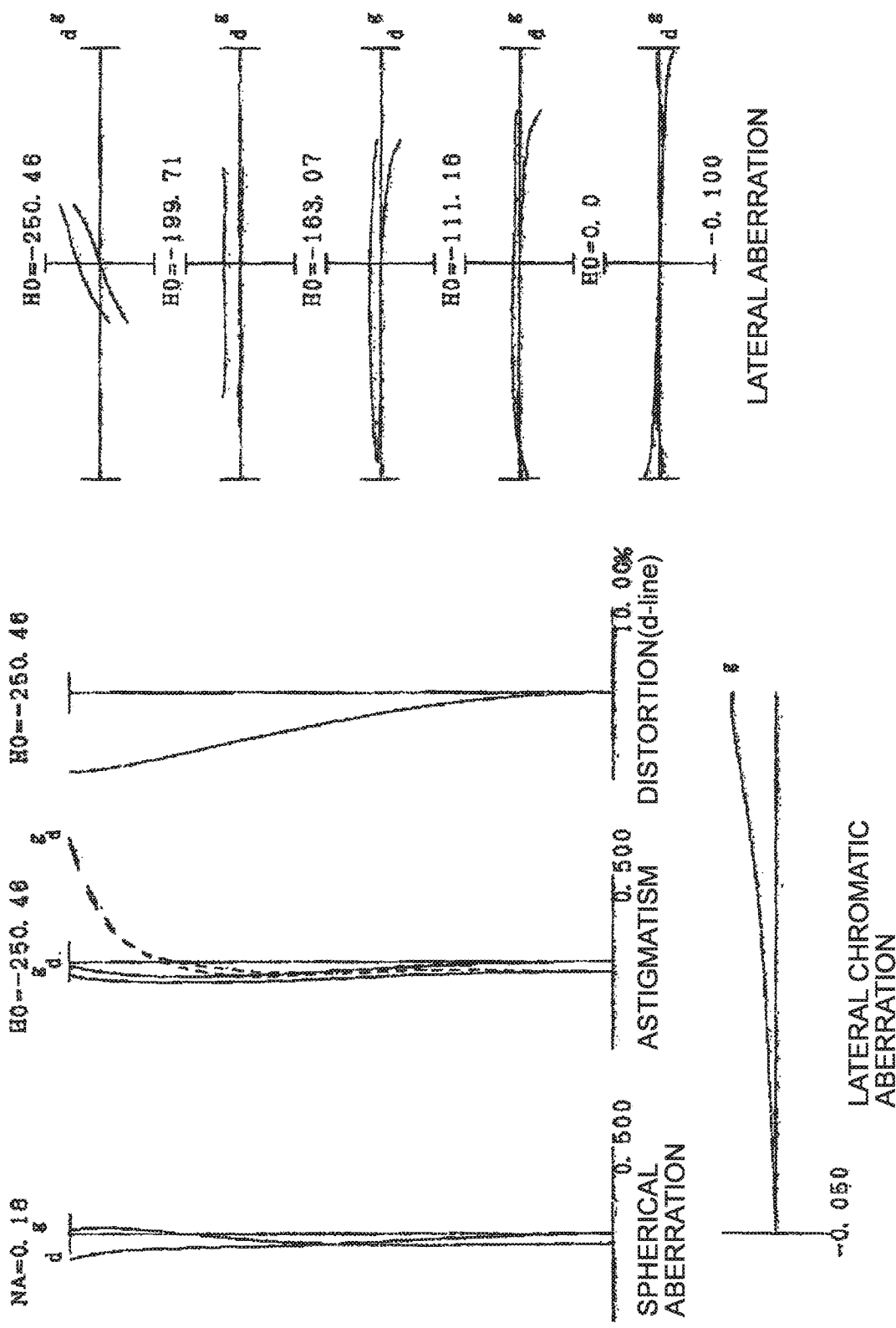
Figure 5C:
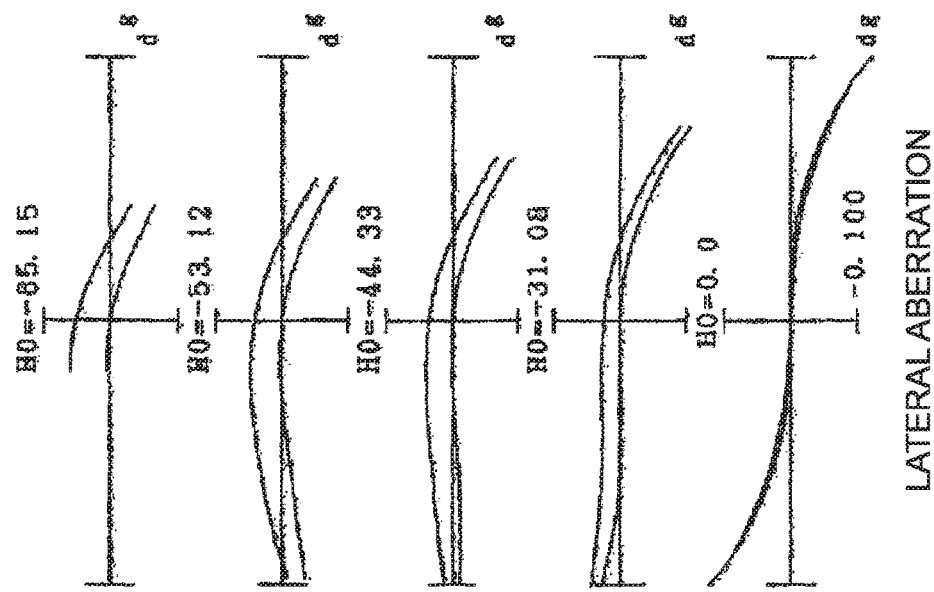
Figure 5C:
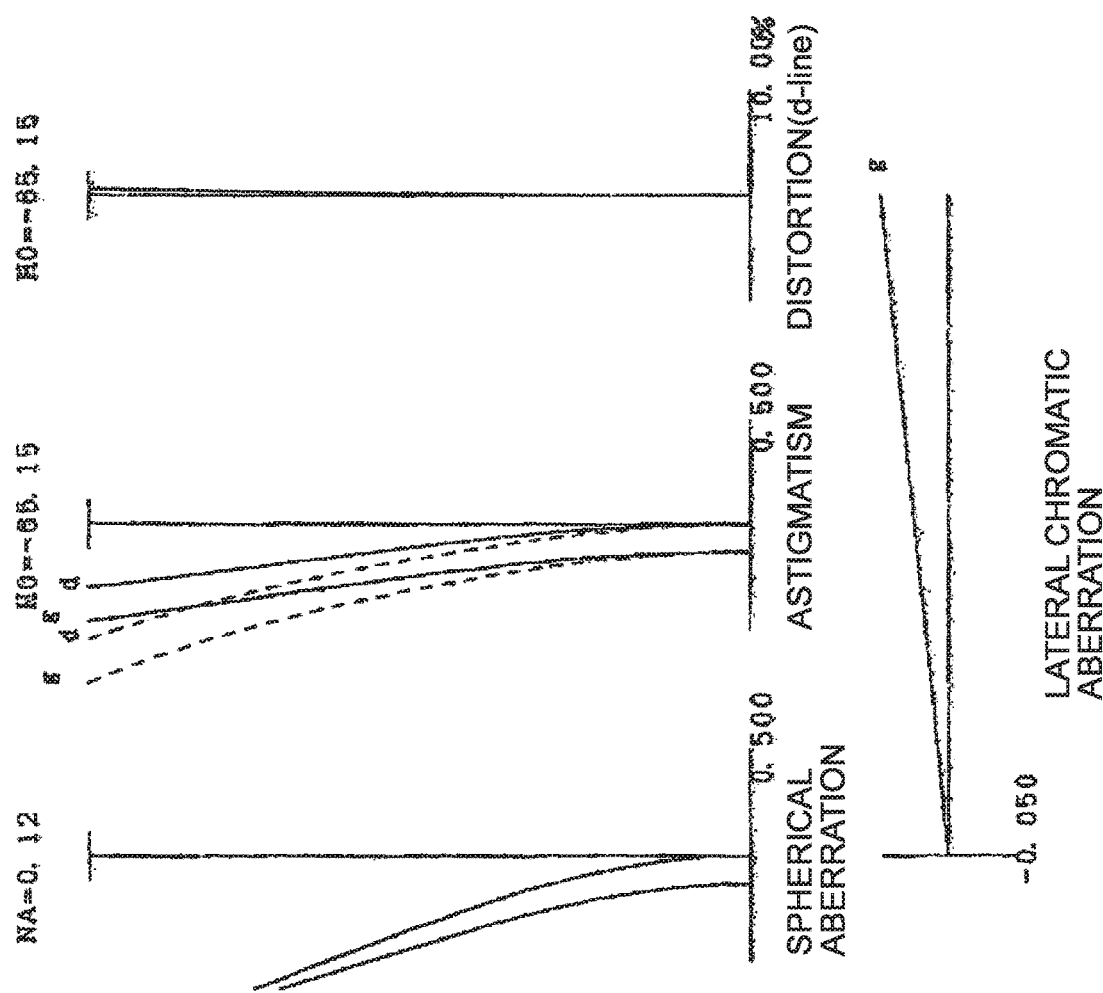

FIG. 2A, FIG. 3A, and FIG. 4A illustrate spherical aberrations, astigmatism aberrations, distortion aberrations, lateral chromatic aberrations, and lateral aberrations of the zoom optical system ZL1 in the wide angle end state, the intermediate focal length state, and the telephoto end state upon focusing on infinity. FIG. 2B, FIG. 3B, and FIG. 4B illustrate lateral aberrations of the zoom optical system ZL1 performing image blur correction in the wide angle end state, the intermediate focal length state, and the telephoto end state upon focusing on infinity. FIGS. 5A-5C illustrate spherical aberrations, astigmatism aberrations, distortion aberrations, lateral chromatic aberrations, and lateral aberrations of the zoom optical system ZL1 in the wide angle end state, the intermediate focal length state, and the telephoto end state upon focusing on a short distance object. In the aberration graphs, FNO denotes an F number, A denotes a half angle of view (unit [°]), NA denotes the number of apertures, and H0 denotes an object height. The spherical aberration graphs illustrate an F number or the number of apertures corresponding to the maximum aperture, astigmatism aberration graphs and distortion aberration graphs illustrate a half angle of view or the maximum object height, and lateral aberration graphs illustrate half angles of view or object heights. d denotes a d line (λ=587.6 nm) and g denotes a g line (λ=435.8 nm). In the astigmatism aberration graphs, a solid line represents a sagittal image surface, and a broken line represents a meridional image surface. In aberration graphs in Examples described below, the same reference signs as in this Example are used. It can be seen in these aberration graphs that the zoom optical system ZL1 can achieve an excellent imaging performance with various aberrations successfully corrected from the wide angle end state to the telephoto end state.

Example 2

FIG. 6 is a diagram illustrating the configuration of the zoom optical system ZL2 according to Example 2. The zoom optical system ZL2 illustrated in FIG. 6 has a configuration including: a first lens group G1 having positive refractive power; a second lens group G2 having negative refractive power; a third lens group G3 having positive refractive power; a fourth lens group 4G having negative refractive power; and a fifth lens group G5 having positive refractive power that are disposed in order from an object.

In the zoom optical system ZL2, the first lens group G1 includes: a cemented lens including a negative meniscus lens L11 having a convex surface facing the object and a biconvex lens L12; and a positive meniscus lens L13 having a convex surface facing the object that are disposed in order from an object. The second lens group G2 includes: a negative meniscus lens L21 having a convex surface facing the object provided with a resin layer on the lens surface facing the object to form an aspherical surface; a biconcave lens L22; a biconvex lens L23; and a negative meniscus lens L24 having a concave surface facing the object that are disposed in order from the object. The third lens group G3 includes: a biconvex lens L31; a cemented lens including a biconvex lens L32 and a negative meniscus lens L33 having a concave surface facing the object; and a biconvex lens L34 that are disposed in order from the object. The fourth lens group G4 includes: a fourth-A lens group G4A having negative refractive power and including a cemented lens including a negative biconcave lens L41 having an aspherical lens surface facing the object and a positive meniscus lens L42 having a convex surface facing the object; and a fourth-B lens group G4B having negative refractive power and including a negative meniscus lens L43 having a concave surface facing the object that are disposed in order from the object. The fifth lens group G5 includes: a biconvex lens L51; a negative meniscus lens L52 having a convex surface facing the object; and a positive biconvex lens L53 having an aspherical lens surface facing the image that are disposed in order from the object. An aperture stop S is provided adjacent to and more on the object side than the third lens group G3. The negative lens L41 and the positive lens L53 are glass-molded aspherical lenses.

In the zoom optical system ZL2, upon zooming from a wide angle end state to a telephoto end state, the lens groups are configured to be moved toward the object along the optical axis to increase a distance between the first lens group G1 and the second lens group G2, decrease a distance between the second lens group G2 and the third lens group G3, increase a distance between the third lens group G3 and the fourth lens group G4, and decrease a distance between the fourth lens group G4 and the fifth lens group G5. The aperture stop S integrally moves with the third lens group G3. The third lens group G3 and the fifth lens group G5 are configured to move with the same movement amount with respect to the image surface.

The zoom optical system ZL2 is configured to perform focusing from infinity to a short-distant object by moving the second lens group G2 toward the object.

The zoom optical system ZL2 is configured to perform correction (vibration isolation) on the position of the image when image shake has occurred by moving the fourth-A lens group G4A in the fourth lens group G4 to have a displacement component in the direction orthogonal to the optical axis. In the wide angle end state in Example 2, the vibration proof coefficient is −0.68 and the focal length is 17.92 (mm), and thus the movement amount of the fourth-A lens group G4A to correct a roll blur of 0.50° is −0.23 (nm). In the intermediate focal length state in Example 2, the vibration proof coefficient is −0.78 and the focal length is 32.00 (nm), and thus the movement amount of the fourth-A lens group G4A to correct a roll blur of 0.50° is −0.36 (mm). In the telephoto end state in Example 2, the vibration proof coefficient is −1.01 and the focal length is 83.00 (mm), and thus the movement amount of the fourth-A lens group G4A to correct a roll blur of 0.50° is −0.72 (mm).

Table 5 below lists specification values of the zoom optical system ZL2. Surface numbers 1 to 33 listed in Table 5 correspond to numbers m1 to m33 in FIG. 6 (FIG. 6 shows a part of the surface numbers).

TABLE 5

Example 2

[Overall specifications]

| | | Wide angle end state | | Intermediate focal length state | | Telephoto end state |
|---|---|---|---|---|---|---|
| f | = | 17.92 | ~ | 32.00 | ~ | 83.00 |
| FNo | = | 2.44 | ~ | 2.92 | ~ | 3.77 |
| ω | = | 40.0 | ~ | 23.4 | ~ | 9.5 |
| Y | = | 14.25 | ~ | 14.25 | ~ | 14.25 |
| TL | = | 132.419 | ~ | 144.654 | ~ | 174.652 |
| BF | = | 41.537 | ~ | 49.713 | ~ | 65.542 |
| BF (air equivalent length) | = | 41.537 | ~ | 49.713 | ~ | 65.542 |

[Lens data]

| m | r | d | nd | νd |
|---|---|---|---|---|
| Object surface | ∞ | | | |
| 1 | 167.51126 | 1.800 | 1.84666 | 23.8 |
| 2 | 65.36598 | 6.800 | 1.59319 | 67.9 |
| 3 | −2500.00000 | 0.100 | | |
| 4 | 53.28844 | 4.400 | 1.81600 | 46.6 |
| 5 | 148.73119 | D5 | | |
| 6* | 98.04448 | 0.200 | 1.56093 | 36.6 |
| 7 | 60.00000 | 1.200 | 1.80400 | 46.6 |
| 8 | 14.40723 | 6.471 | | |
| 9 | −27.00000 | 1.000 | 1.81600 | 46.6 |
| 10 | 49.41381 | 0.749 | | |
| 11 | 42.76510 | 4.500 | 1.84666 | 23.8 |
| 12 | −29.37797 | 1.000 | | |
| 13 | −19.04811 | 1.000 | 1.88300 | 40.7 |
| 14 | −46.90749 | D14 | | |
| 15 | 0.00000 | 0.400 | | Aperture stop S |
| 16 | 436.00582 | 2.927 | 1.54814 | 45.8 |
| 17 | −30.11148 | 0.150 | | |
| 18 | 59.43487 | 4.000 | 1.48749 | 70.3 |
| 19 | −28.97361 | 1.100 | 1.90200 | 25.3 |
| 20 | −62.61619 | 0.100 | | |
| 21 | 56.98362 | 2.750 | 1.49782 | 82.6 |
| 22 | −76.57983 | D22 | | |
| 23* | −41.28693 | 0.800 | 1.79050 | 45.0 |
| 24 | 37.52861 | 2.000 | 1.90200 | 25.3 |
| 25 | −3339.51980 | 3.000 | | |
| 26 | −26.16246 | 1.000 | 1.72916 | 54.6 |
| 27 | −49.02058 | D27 | | |
| 28 | 36.11715 | 4.600 | 1.49782 | 82.6 |
| 29 | −43.89441 | 0.100 | | |
| 30 | 67.43312 | 1.200 | 1.91748 | 28.6 |
| 31 | 25.37662 | 1.310 | | |
| 32 | 37.12949 | 4.271 | 1.49786 | 82.5 |
| 33* | −39.01900 | BF | | |
| Image surface | ∞ | | | |

[Focal lengths of lens groups]

| Lens group | Starting surface | Focal length |
|---|---|---|
| First lens group | 1 | 87.89 |
| Second lens group | 6 | −13.10 |
| Third lens group | 15 | 24.40 |
| Fourth lens group | 23 | −33.98 |
| Fifth lens group | 28 | 36.22 |

In the zoom optical system ZL2, 6th, 23rd, and 33rd surfaces have aspherical shapes. Table 6 lists aspherical data, that is, a conical coefficient K and aspherical coefficients A4 to A12.

TABLE 6

[Aspherical data]

| A4 | A6 | A8 | A10 | A12 |
|---|---|---|---|---|
| 6th surface K = 1.00000e+00 | | | | |
| 1.85470e−05 | −4.02525e−08 | 2.54277e−10 | −1.05685e−12 | 3.80620e−15 |
| 23rd surface K = 1.00000e+00 | | | | |
| 3.85870e−06 | 6.25371e−10 | 0.00000e+00 | 0.00000e+00 | 0.00000e+00 |
| 33rd surface K = −3.93240e+00 | | | | |
| 2.65953e−06 | 1.69344e−08 | −8.71281e−13 | 1.49597e−13 | 0.00000e+00 |

In the zoom optical system ZL2, the axial distance D5 between the first lens group G1 and the second lens group G2, the axial distance D14 between the second lens group G2 and the third lens group G3 (aperture stop S), the axial distance D22 between the third lens group G3 and the fourth lens group G4, the axial distance D27 between the fourth lens group G4 and the fifth lens group G5, and the back focus BF are changed upon zooming as described above. Table 7 below lists variable distances in each focal length state of the wide angle end state (W), the intermediate focal length state (M), and the telephoto end state (T) in the focusing-on-infinity state and the focusing-on-a-short-distant-object state.

TABLE 7

[Variable distance data]

| | Infinity | | | Short distance | | |
|---|---|---|---|---|---|---|
| | W | M | T | W | M | T |
| D0 | ∞ | ∞ | ∞ | 217.58 | 205.35 | 175.35 |
| β | — | — | — | −0.0704 | −0.1176 | −0.2335 |
| f | 17.92 | 32.00 | 83.00 | — | — | — |
| D5 | 2.650 | 15.012 | 36.908 | 1.386 | 13.195 | 32.734 |
| D14 | 18.429 | 10.126 | 2.400 | 19.693 | 11.944 | 6.574 |
| D22 | 1.400 | 5.657 | 9.876 | 1.400 | 5.657 | 9.876 |
| D27 | 9.476 | 5.219 | 1.000 | 9.476 | 5.219 | 1.000 |
| BF | 41.537 | 49.713 | 65.542 | 41.537 | 49.713 | 65.542 |

Next, Table 8 lists conditional expression corresponding values in the zoom optical system ZL2.

TABLE 8 f5w = 36.22
[Conditional expression corresponding values]

(1)(−f4)/f5w = 0.938
(2)FNw = 2.443
(3)N5n − N5p = 0.420
(4)N5n = 1.917
(5)ft/fw = 4.632
(6)FNt = 3.769
(7)f1/f3 = 3.602
(8)f2/f4 = 0.385
(9)N2max = 1.883
(10)fw/f3 = 0.734
(11)fw/(−f4) = 0.527
(12)ft/f3 = 3.401
(13)ft/(−f4) = 2.442
(14)N3n − N3p = 0.391
(15)N3n = 1.902
(16)ωw = 39.990
(17)ωt = 9.463

In this manner, the zoom optical system ZL2 satisfies all the conditional expressions (1) to (17) described above.

Figure 7A:
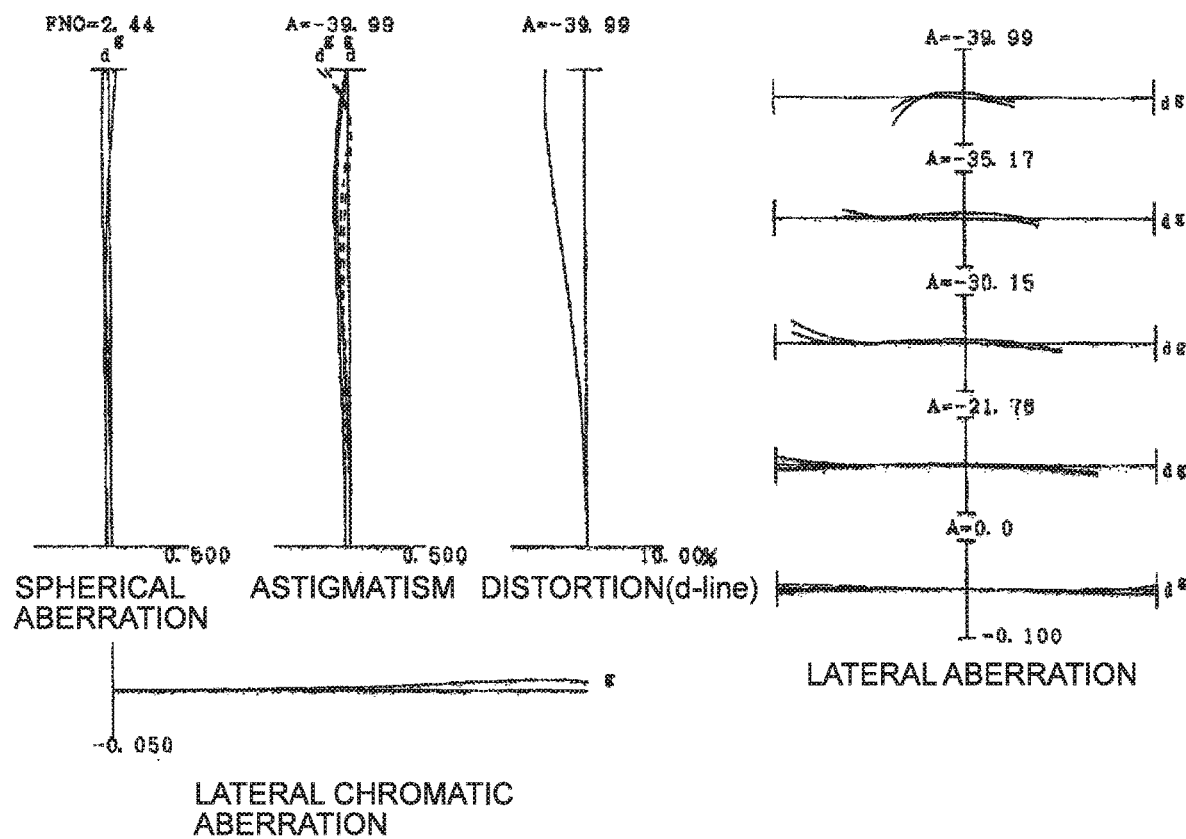
FIGS. 7A and 7B are various aberration graphs of the zoom optical system in a wide angle end state according to Example 2, FIG. 7A being a various aberration graph in a focusing-on-infinity state, FIG. 7B being a lateral aberration graph in the focusing-on-infinity state with image shake correction performed.
Figure 7B:
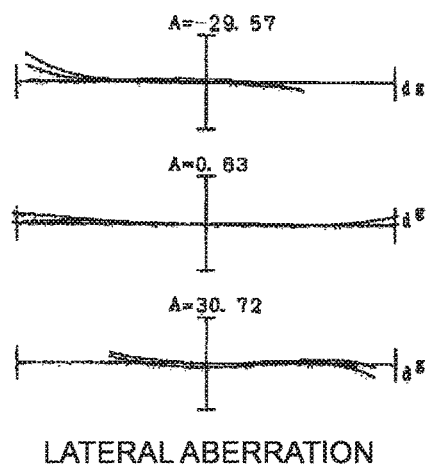
Figure 8A:
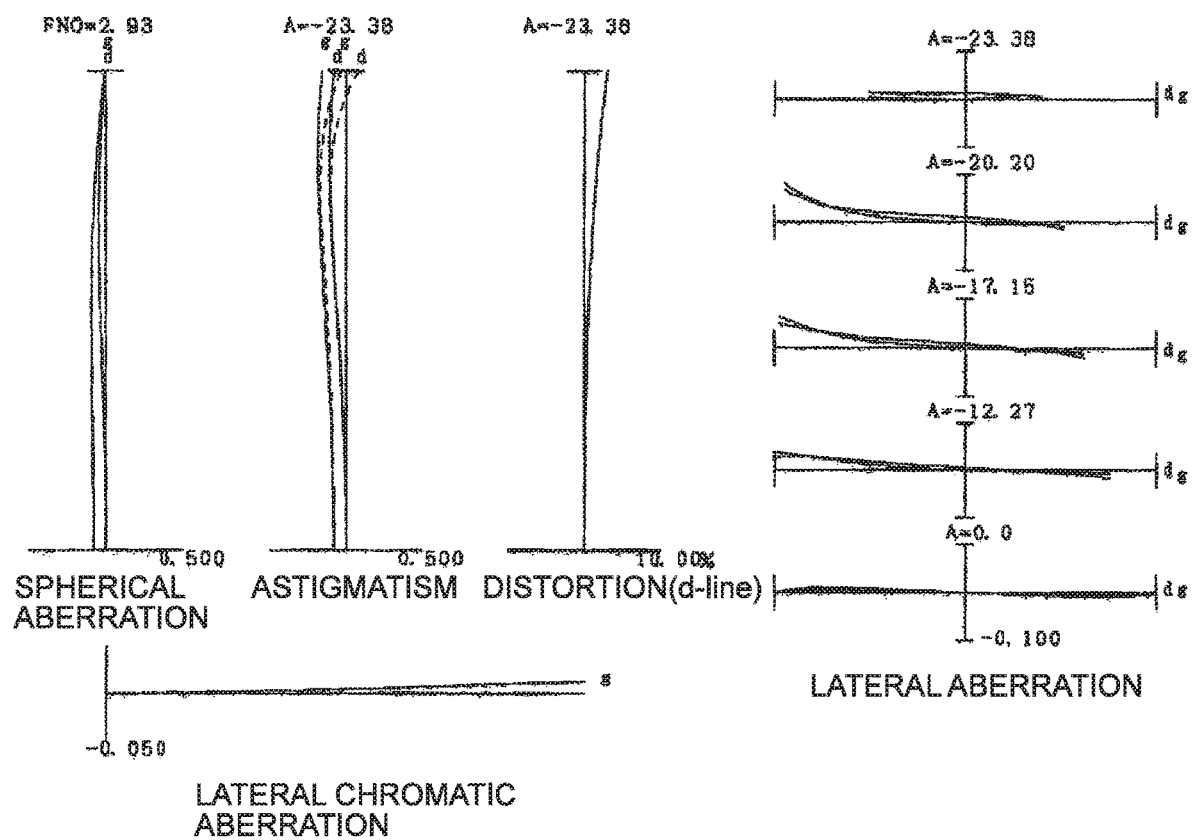
FIGS. 8A and 8B are various aberration graphs of the zoom optical system in an intermediate focal length state according to Example 2, FIG. 8A being a various aberration graph in the focusing-on-infinity state, FIG. 8B being a lateral aberration graph in the focusing-on-infinity state with image shake correction performed.
Figure 8B:
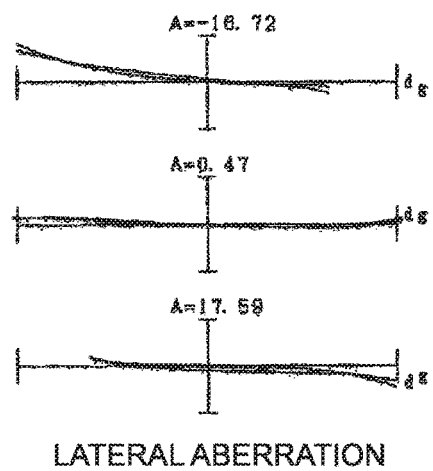
Figure 9A:
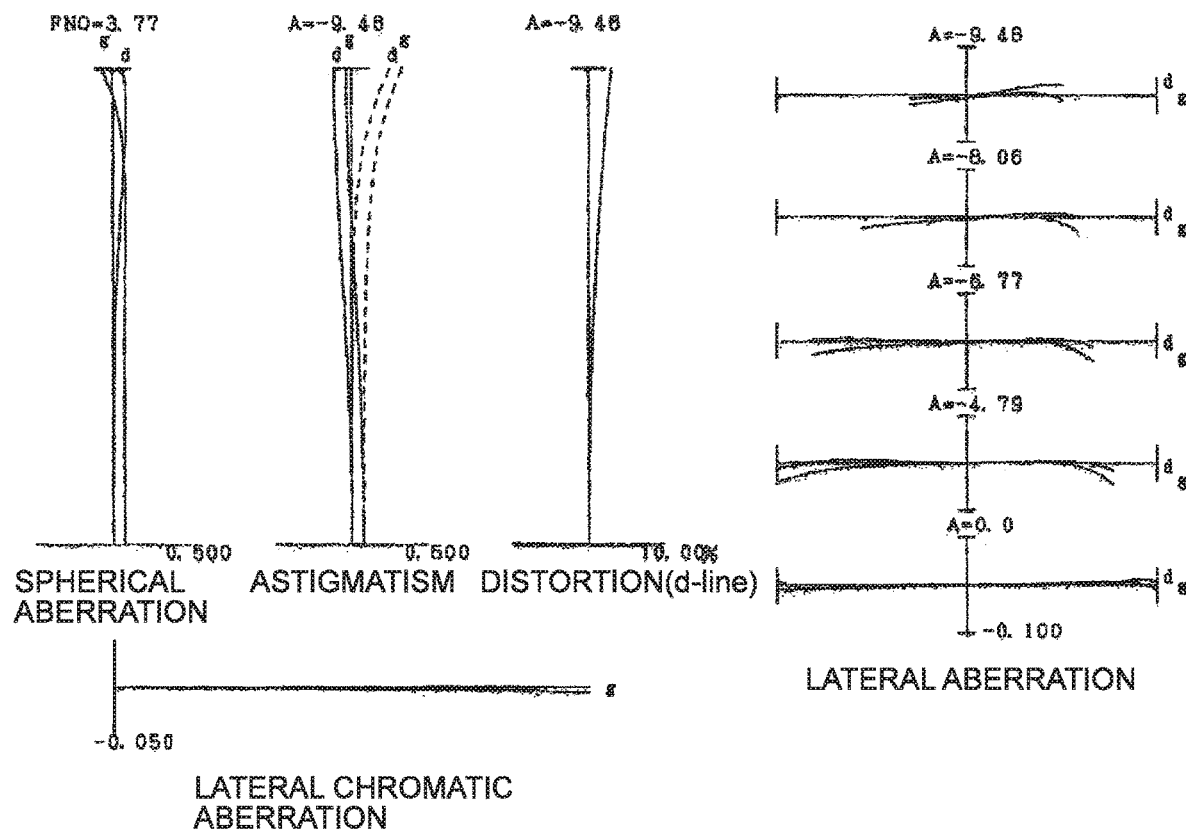
FIGS. 9A and 9B are various aberration graphs of the zoom optical system in a telephoto end state according to Example 2, FIG. 9A being a various aberration graph in the focusing-on-infinity state, FIG. 9B being a lateral aberration graph in the focusing-on-infinity state with image shake correction performed.
Figure 9B:
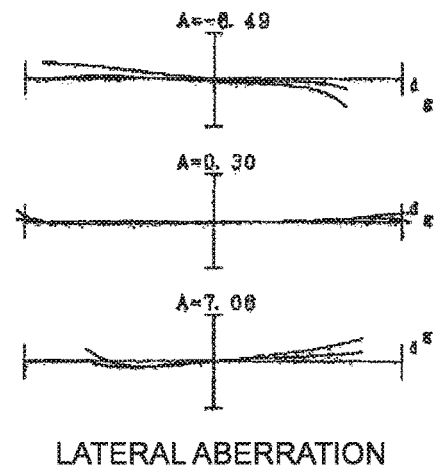
Figure 10A:
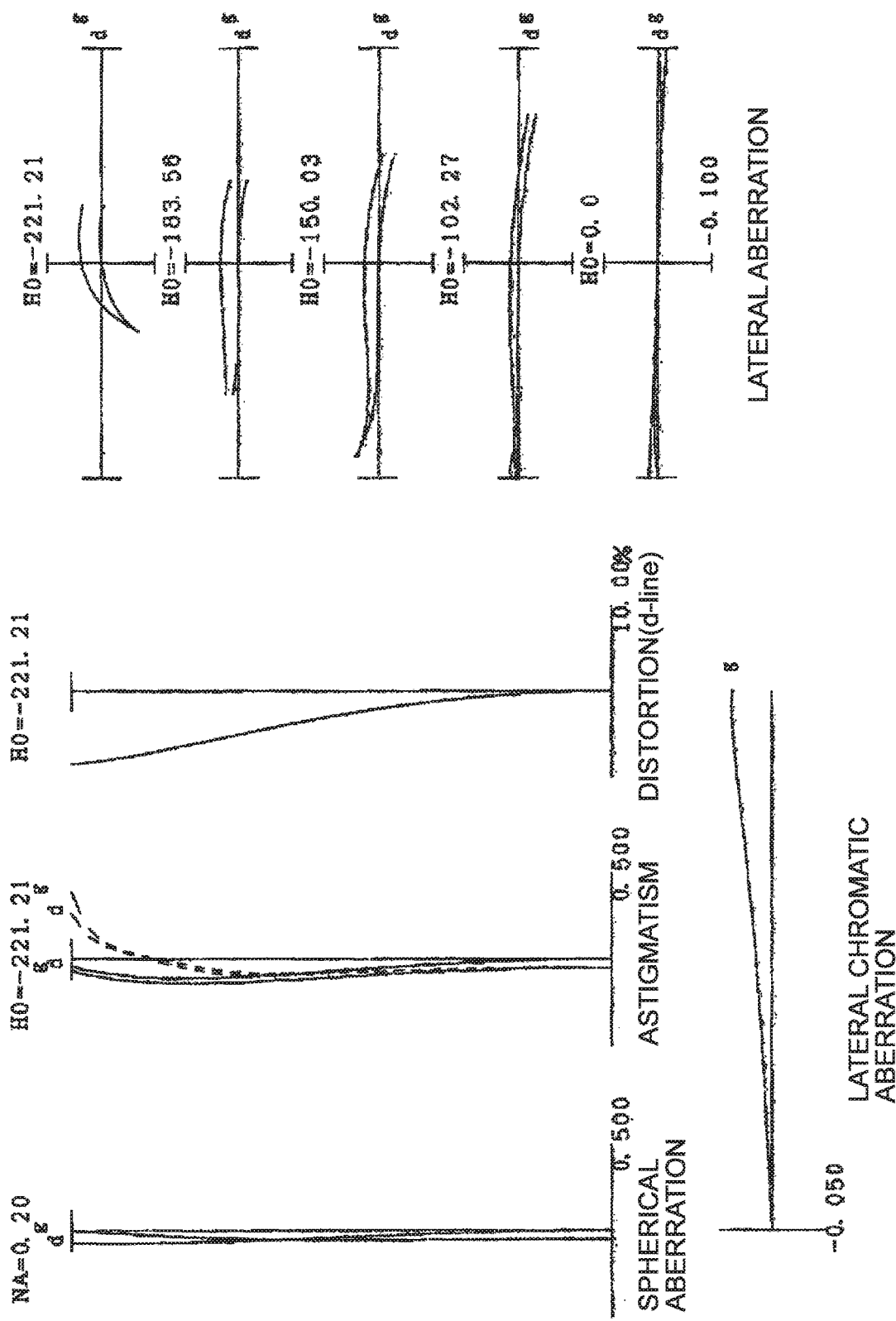
FIGS. 10A-10C are various aberration graphs of the zoom optical system in a focusing-on-a-short-distant-object state according to Example 2, FIG. 10A being a various aberration graph in a wide angle end state, FIG. 10B being a various aberration graph in an intermediate focal length state, FIG. 10C being a various aberration graph in a telephoto end state.
Figure 10B:
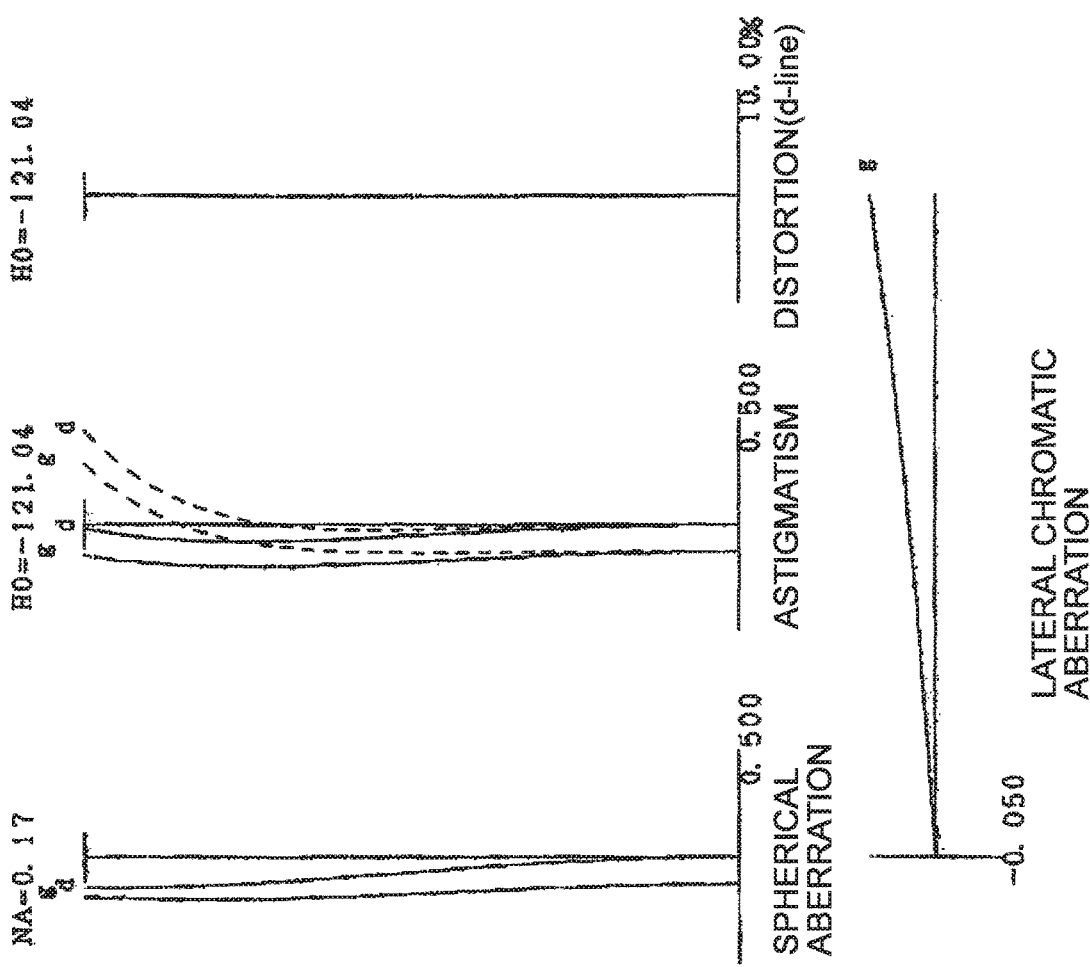
Figure 10C:
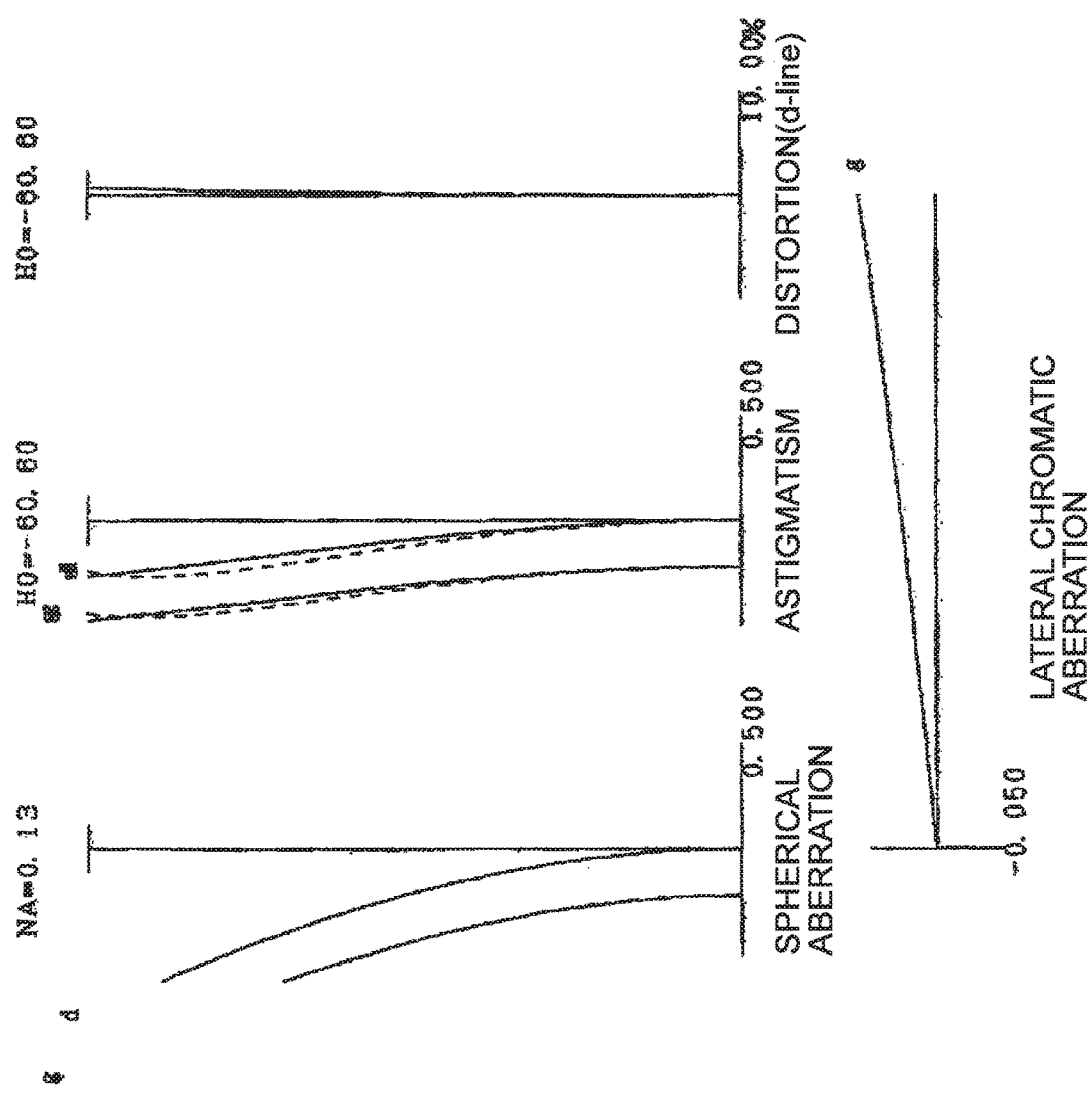

FIG. 7A, FIG. 8A, and FIG. 9A illustrate spherical aberrations, astigmatism aberrations, distortion aberrations, lateral chromatic aberrations, and lateral aberrations of the zoom optical system ZL2 in the wide angle end state, the intermediate focal length state, and the telephoto end state upon focusing on infinity. FIG. 7B, FIG. 8B, and FIG. 9B illustrate lateral aberrations of the zoom optical system ZL2 performing image blur correction in the wide angle end state, the intermediate focal length state, and the telephoto end state upon focusing on infinity. FIGS. 10A-10C illustrate spherical aberrations, astigmatism aberrations, distortion aberrations, lateral chromatic aberrations, and lateral aberrations of the zoom optical system ZL2 in the wide angle end state, the intermediate focal length state, and the telephoto end state upon focusing on a short distance object. It can be seen in these aberration graphs that the zoom optical system ZL2 can achieve an excellent imaging performance with various aberrations successfully corrected from the wide angle end state to the telephoto end state.

Example 3

FIG. 11 is a diagram illustrating the configuration of the zoom optical system ZL3 according to Example 3. The zoom optical system ZL3 illustrated in FIG. 11 has a configuration including: a first lens group G1 having positive refractive power; a second lens group G2 having negative refractive power; a third lens group G3 having positive refractive power; a fourth lens group 4G having negative refractive power; a fifth lens group G5 having positive refractive power; and a sixth lens group G6 having positive refractive power that are disposed in order from an object.

In the zoom optical system ZL3, the first lens group G1 includes: a cemented lens including a negative meniscus lens L11 having a convex surface facing the object and a biconvex lens L12; and a positive meniscus lens L13 having a convex surface facing the object that are disposed in order from an object. The second lens group G2 includes: a negative meniscus lens L21 having a convex surface facing the object provided with a resin layer on the lens surface facing the object to form an aspherical surface; a biconcave lens L22; a biconvex lens L23; and a negative meniscus lens L24 having a concave surface facing the object that are disposed in order from the object. The third lens group G3 includes: a biconvex lens L31; a cemented lens including a biconvex lens L32 and a negative meniscus lens L33 having a concave surface facing the object; and a biconvex lens L34 that are disposed in order from the object. The fourth lens group G4 includes: a fourth-A lens group G4A having negative refractive power and including a cemented lens including a negative biconcave lens L41 having an aspherical lens surface facing the object and a positive meniscus lens L42 having a convex surface facing the object; and a fourth-B lens group G4B having negative refractive power and including a negative meniscus lens L43 having a concave surface facing the object that are disposed in order from the object. The fifth lens group G5 includes: a biconvex lens L51, and a cemented lens including a positive biconvex lens L52 having an aspherical lens surface facing the object and a negative meniscus lens L53 having a concave surface facing the object that are disposed in order from the object. The sixth lens group G6 includes: a positive meniscus lens L61 having a concave surface facing the object and having an aspherical lens surface facing the image. An aperture stop S is provided adjacent to and more on the object side than the third lens group G3. The negative lens L41, the positive lens L52, and the positive lens L61 are glass-molded aspherical lenses.

In the zoom optical system ZL3, upon zooming from a wide angle end state to a telephoto end state, the lens groups are configured to be moved toward the object along the optical axis to increase a distance between the first lens group G1 and the second lens group G2, decrease a distance between the second lens group G2 and the third lens group G3, increase a distance between the third lens group G3 and the fourth lens group G4, decrease a distance between the fourth lens group G4 and the fifth lens group G5, and increase a distance between the fifth lens group G5 and the sixth lens group G6. The aperture stop S integrally moves with the third lens group G3. The third lens group G3 and the fifth lens group G5 are configured to move with the same movement amount with respect to the image surface.

The zoom optical system ZL3 is configured to perform focusing from infinity to a short-distant object by moving the second lens group G2 toward the object.

The zoom optical system ZL3 is configured to perform correction (vibration isolation) on the position of the image when image shake has occurred by moving the fourth-A lens group G4A in the fourth lens group G4 to have a displacement component in the direction orthogonal to the optical axis. In the wide angle end state in Example 3, the vibration proof coefficient is −0.67 and the focal length is 18.60 (mm), and thus the movement amount of the fourth-A lens group G4A to correct a roll blur of 0.50° is −0.24 (mm). In the intermediate focal length state in Example 3, the vibration proof coefficient is −0.76 and the focal length is 31.80 (mm), and thus the movement amount of the fourth-A lens group G4A to correct a roll blur of 0.50° is −0.37 (mm). In the telephoto end state in Example 3, the vibration proof coefficient is −0.95 and the focal length is 77.81 (mm), and thus the movement amount of the fourth-A lens group G4A to correct a roll blur of 0.50° is −0.71 (mm).

Table 9 below lists specification values of the zoom optical system ZL3. Surface numbers 1 to 34 listed in Table 9 correspond to numbers m1 to m34 in FIG. 11 (FIG. 11 shows a part of the surface numbers).

TABLE 9

Example 3

[Overall specifications]

|  |  | Wide angle end state |  | Intermediate focal length state |  | Telephoto end state |
|---|---|---|---|---|---|---|
| f | = | 18.60 | ~ | 31.80 | ~ | 77.81 |
| FNo | = | 2.01 | ~ | 2.34 | ~ | 2.96 |
| ω | = | 38.9 | ~ | 23.5 | ~ | 10.1 |

TABLE 9-continued

| Y | = | 14.25 | ~ | 14.25 | ~ | 14.25 |
|---|---|---|---|---|---|---|
| TL | = | 134.524 | ~ | 147.355 | ~ | 176.966 |
| BF | = | 38.015 | ~ | 45.607 | ~ | 60.406 |
| BF (air equivalent length) | = | 38.015 | ~ | 45.607 | ~ | 60.406 |

[Lens data]

| m | r | d | nd | νd |
|---|---|---|---|---|
| Object surface | ∞ |  |  |  |
| 1 | 160.52802 | 1.800 | 1.84666 | 23.8 |
| 2 | 65.03652 | 6.800 | 1.59319 | 67.9 |
| 3 | −2500.00000 | 0.100 |  |  |
| 4 | 52.64606 | 4.400 | 1.81600 | 46.6 |
| 5 | 143.14329 | D5 |  |  |
| 6* | 96.56216 | 0.200 | 1.56093 | 36.6 |
| 7 | 60.00000 | 1.200 | 1.80400 | 46.6 |
| 8 | 14.83792 | 6.143 |  |  |
| 9 | −27.00000 | 1.000 | 1.81600 | 46.6 |
| 10 | 44.96605 | 0.853 |  |  |
| 11 | 43.56313 | 4.500 | 1.84666 | 23.8 |
| 12 | −24.56322 | 0.812 |  |  |
| 13 | −18.65534 | 1.000 | 1.88300 | 40.7 |
| 14 | −61.97483 | D14 |  |  |
| 15 | 0.00000 | 0.400 |  |  | Aperture stop S |
| 16 | 159.25973 | 3.913 | 1.58913 | 61.2 |
| 17 | −34.07018 | 0.150 |  |  |
| 18 | 47.41744 | 5.310 | 1.57479 | 62.2 |
| 19 | −36.74413 | 1.100 | 1.90200 | 25.3 |
| 20 | −177.06283 | 0.100 |  |  |
| 21 | 62.88551 | 3.778 | 1.49782 | 82.6 |
| 22 | −66.42221 | D22 |  |  |
| 23* | −41.70870 | 0.800 | 1.79050 | 45.0 |
| 24 | 42.89444 | 2.100 | 1.90200 | 25.3 |
| 25 | −2019.67150 | 3.000 |  |  |
| 26 | −26.60428 | 1.000 | 1.72916 | 54.6 |
| 27 | −53.45527 | D27 |  |  |
| 28 | 1984.71100 | 4.800 | 1.50514 | 74.0 |
| 29 | −25.14230 | 0.100 |  |  |
| 30* | 64.22325 | 5.500 | 1.49782 | 82.6 |
| 31 | −26.83334 | 1.200 | 1.88202 | 37.2 |
| 32 | −326.49263 | D32 |  |  |
| 33 | −64.59872 | 3.428 | 1.49782 | 82.6 |
| 34* | −25.07133 | BF |  |  |
| Image surface | ∞ |  |  |  |

[Focal lengths of lens groups]

| Lens group | Starting surface | Focal length |
|---|---|---|
| First lens group | 1 | 86.55 |
| Second lens group | 6 | −13.10 |
| Third lens group | 15 | 23.83 |
| Fourth lens group | 23 | −33.00 |
| Fifth lens group | 28 | 56.67 |
| Sixth lens group | 33 | 80.00 |

In the zoom optical system ZL3, 6th, 23rd, 30th, and 34th surfaces have aspherical shapes. Table 10 lists aspherical data, that is, a conical coefficient K and aspherical coefficients A4 to A12.

TABLE 10

[Aspherical data]

| A4 | A6 | A8 | A10 | A12 |
|---|---|---|---|---|
| \multicolumn{5}{c}{6th surface K = 1.00000e+00} | | | | |
| 1.75539e−05 | −6.44055e−09 | −1.64524e−10 | 1.05588e−12 | 6.14360e−16 |
| \multicolumn{5}{c}{23rd surface K = 1.00000e+00} | | | | |
| 5.80858e−06 | −1.19924e−08 | 0.00000e+00 | 0.00000e+00 | 0.00000e+00 |
| \multicolumn{5}{c}{30th surface K = −1.79426e+01} | | | | |
| −7.47242e−06 | 1.89731e−08 | −3.85325e−10 | 9.87434e−13 | 0.00000e+00 |
| \multicolumn{5}{c}{34th surface K = 4.62100e−01} | | | | |
| −7.86061e−07 | 2.71115e−08 | −2.30871e−10 | 4.72584e−13 | 0.00000e+00 |

In the zoom optical system ZL3, the axial distance D5 between the first lens group G1 and the second lens group G2, the axial distance D14 between the second lens group G2 and the third lens group G3 (aperture stop S), the axial distance D22 between the third lens group G3 and the fourth lens group G4, the axial distance D27 between the fourth lens group G4 and the fifth lens group G5, the axial distance D32 between the fifth lens group G5 and the sixth lens group G6, and the back focus BF are changed upon zooming as described above. Table 11 below lists variable distances in each focal length state of the wide angle end state (W), the intermediate focal length state (M), and the telephoto end state (T) in the focusing-on-infinity state and the focusing-on-a-short-distant-object state.

TABLE 11

[Variable distance data]

| | Infinity | | | Short distance | | |
|---|---|---|---|---|---|---|
| | W | M | T | W | M | T |
| D0 | ∞ | ∞ | ∞ | 215.48 | 202.64 | 173.03 |
| β | — | — | — | −0.0737 | −0.1184 | −0.2280 |
| f | 18.60 | 31.80 | 77.81 | — | — | — |
| D5 | 2.336 | 14.327 | 34.805 | 1.052 | 12.483 | 30.752 |
| D14 | 17.818 | 10.066 | 2.400 | 19.102 | 11.910 | 6.452 |
| D22 | 1.400 | 4.791 | 8.625 | 1.400 | 4.791 | 8.625 |
| D27 | 8.224 | 4.833 | 1.000 | 8.224 | 4.833 | 1.000 |
| D32 | 1.244 | 2.244 | 4.244 | 1.244 | 2.244 | 4.244 |
| BF | 38.015 | 45.607 | 60.406 | 38.015 | 45.607 | 60.406 |

Next, Table 12 lists conditional expression corresponding values in the zoom optical system ZL3.

TABLE 12 f5w = 36.20
[Conditional expression corresponding values]

(1)(−f4)/f5w = 0.912
(2)FNw = 2.010
(3)N5n − N5p = 0.381
(4)N5n = 1.882
(5)ft/fw = 4.183
(6)FNt = 2.957
(7)f1/f3 = 3.631
(8)f2/f4 = 0.397
(9)N2max = 1.883
(10)fw/f3 = 0.780
(11)fw/(−f4) = 0.564
(12)ft/f3 = 3.265
(13)ft/(−f4) = 2.358

TABLE 12-continued f5w = 36.20
[Conditional expression corresponding values]

(14)N3n − N3p = 0.348
(15)N3n = 1.902
(16)ωw = 38.943
(17)ωt = 10.081

In this manner, the zoom optical system ZL3 satisfies all the conditional expressions (1) to (17) described above.

Figure 12A:
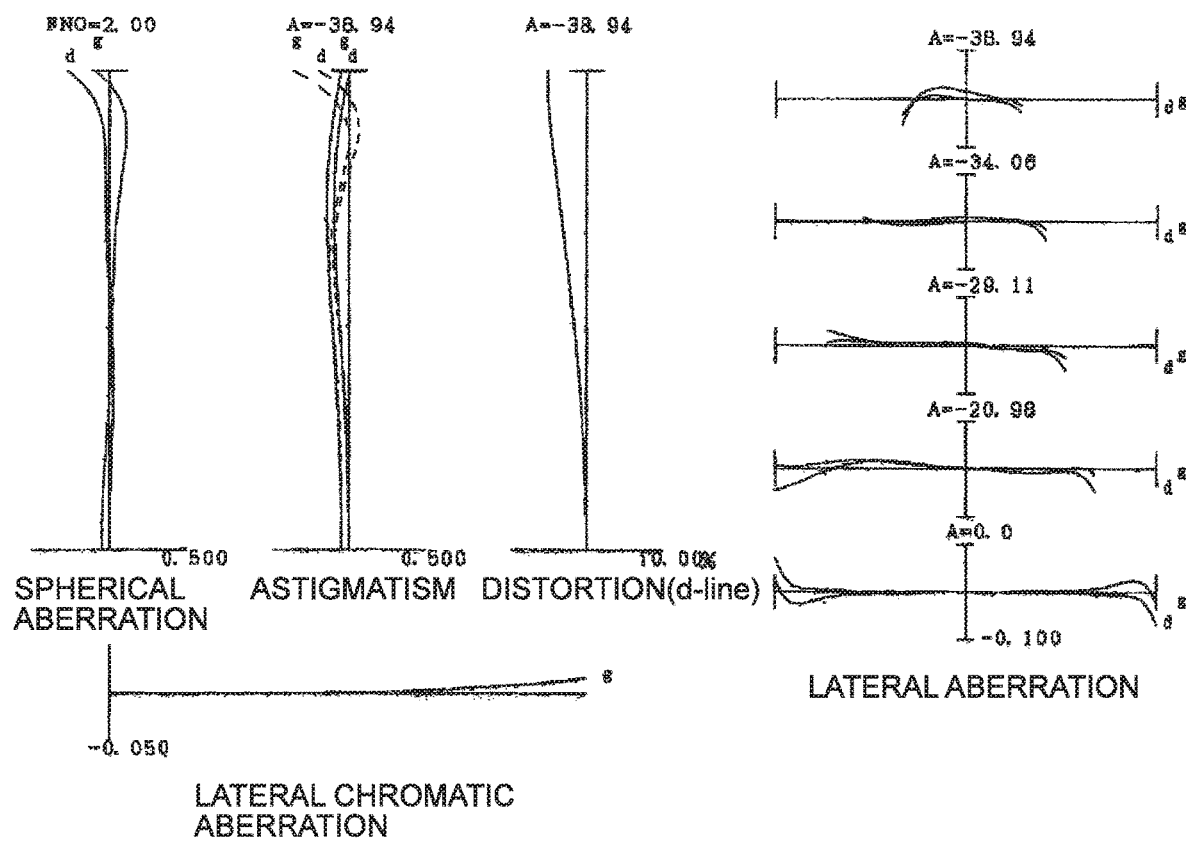
FIGS. 12A and 12B are various aberration graphs of the zoom optical system in a wide angle end state according to Example 3, FIG. 12A being a various aberration graph in a focusing-on-infinity state, FIG. 12B being a lateral aberration graph in the focusing-on-infinity state with image shake correction performed.
Figure 12B:
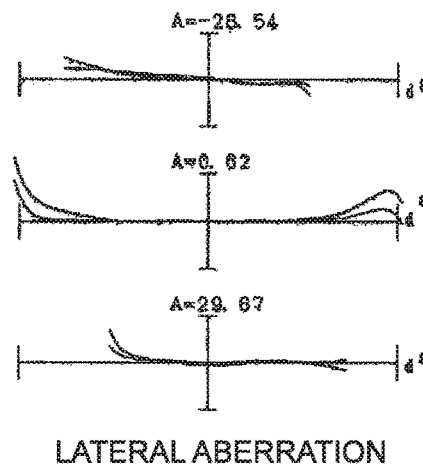
Figure 13A:
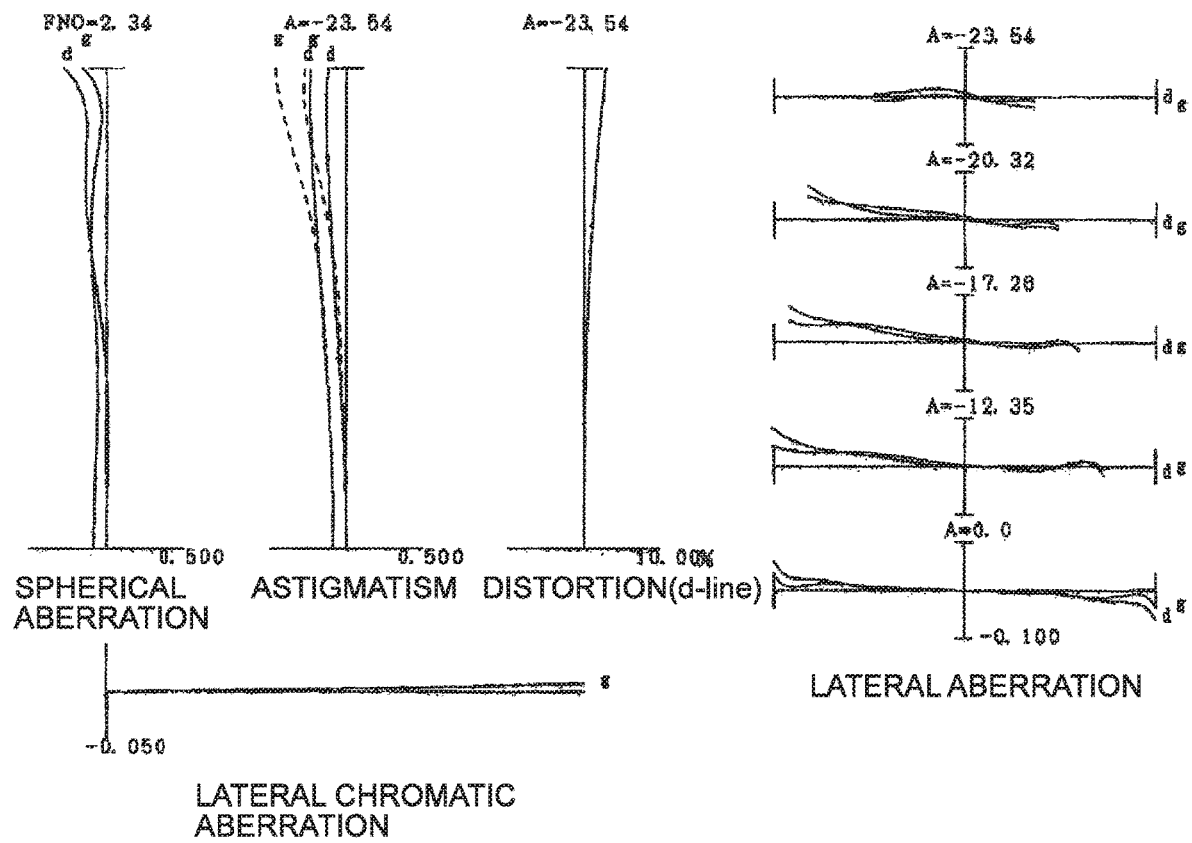
FIGS. 13A and 13B are various aberration graphs of the zoom optical system in an intermediate focal length state according to Example 3, FIG. 13A being a various aberration graph in the focusing-on-infinity state, FIG. 13B being a lateral aberration graph in the focusing-on-infinity state with image shake correction performed.
Figure 13B:
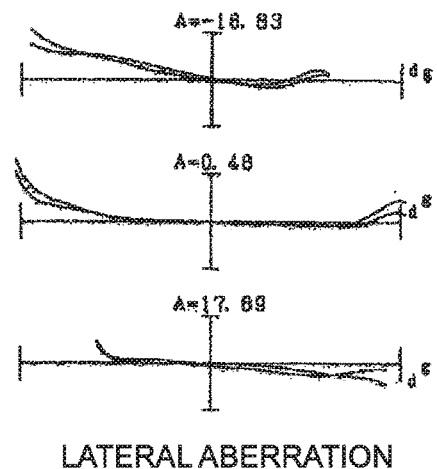
Figure 14A:
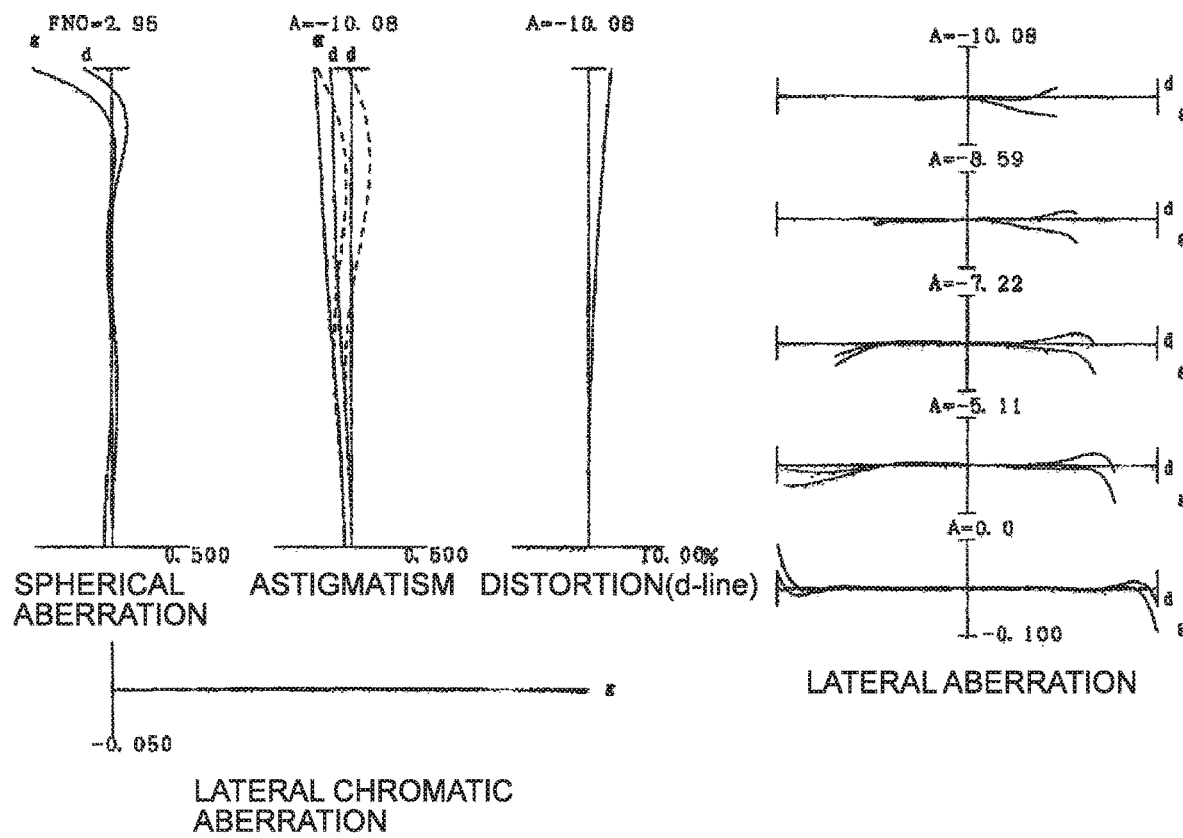
FIGS. 14A and 14B are various aberration graphs of the zoom optical system in a telephoto end state according to Example 3, FIG. 14A being a various aberration graph in the focusing-on-infinity state, FIG. 14B being a lateral aberration graph in the focusing-on-infinity state with image shake correction performed.
Figure 14B:
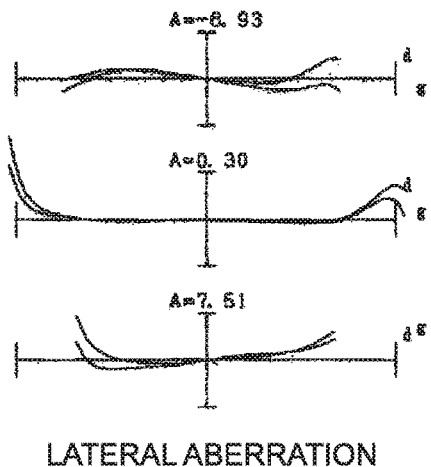
Figure 15A:
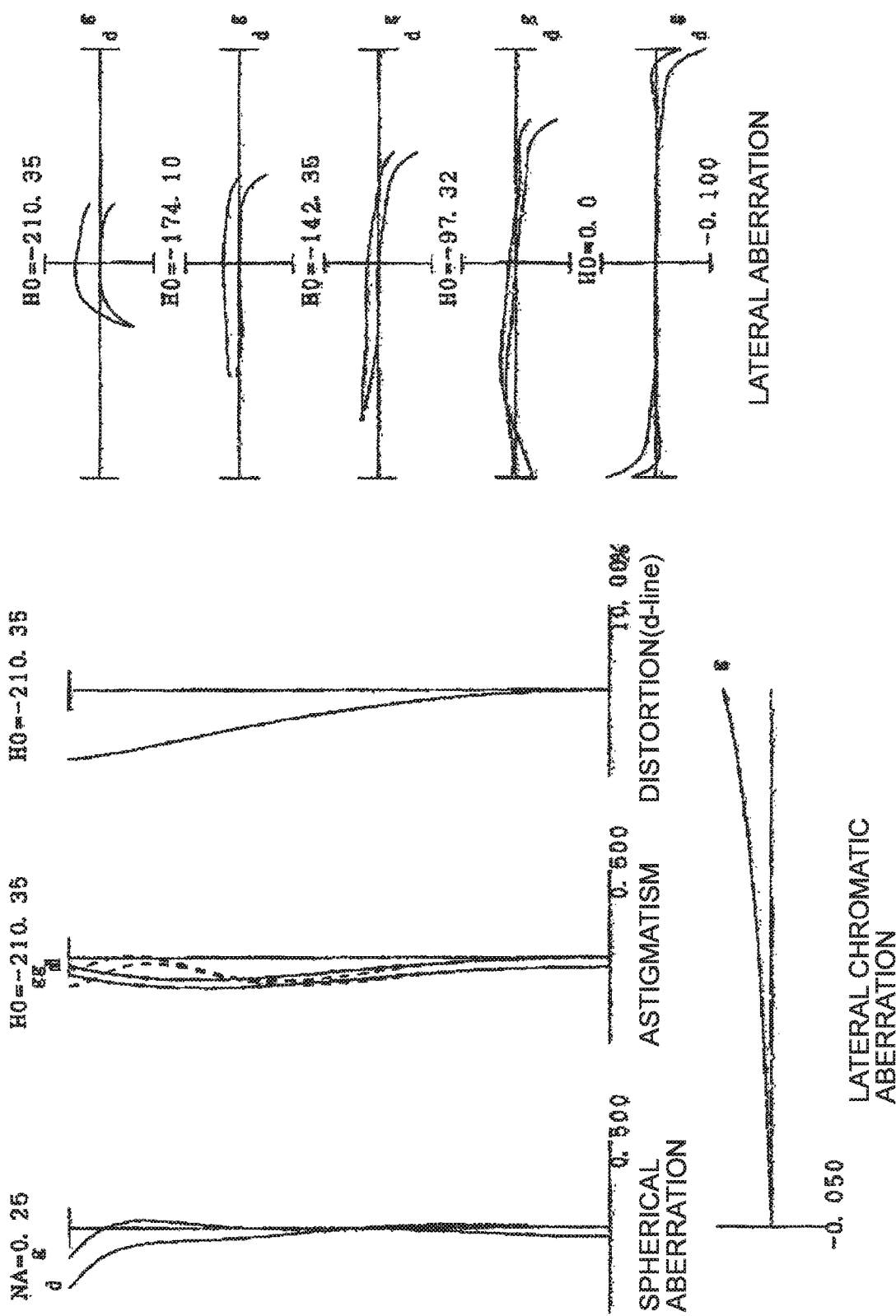
FIGS. 15A-15C are various aberration graphs of the zoom optical system in a focusing-on-a-short-distant-object state according to Example 3, FIG. 15A being a various aberration graph in a wide angle end state, FIG. 15B being a various aberration graph in an intermediate focal length state, FIG. 15C being a various aberration graph in a telephoto end state.
Figure 15B:
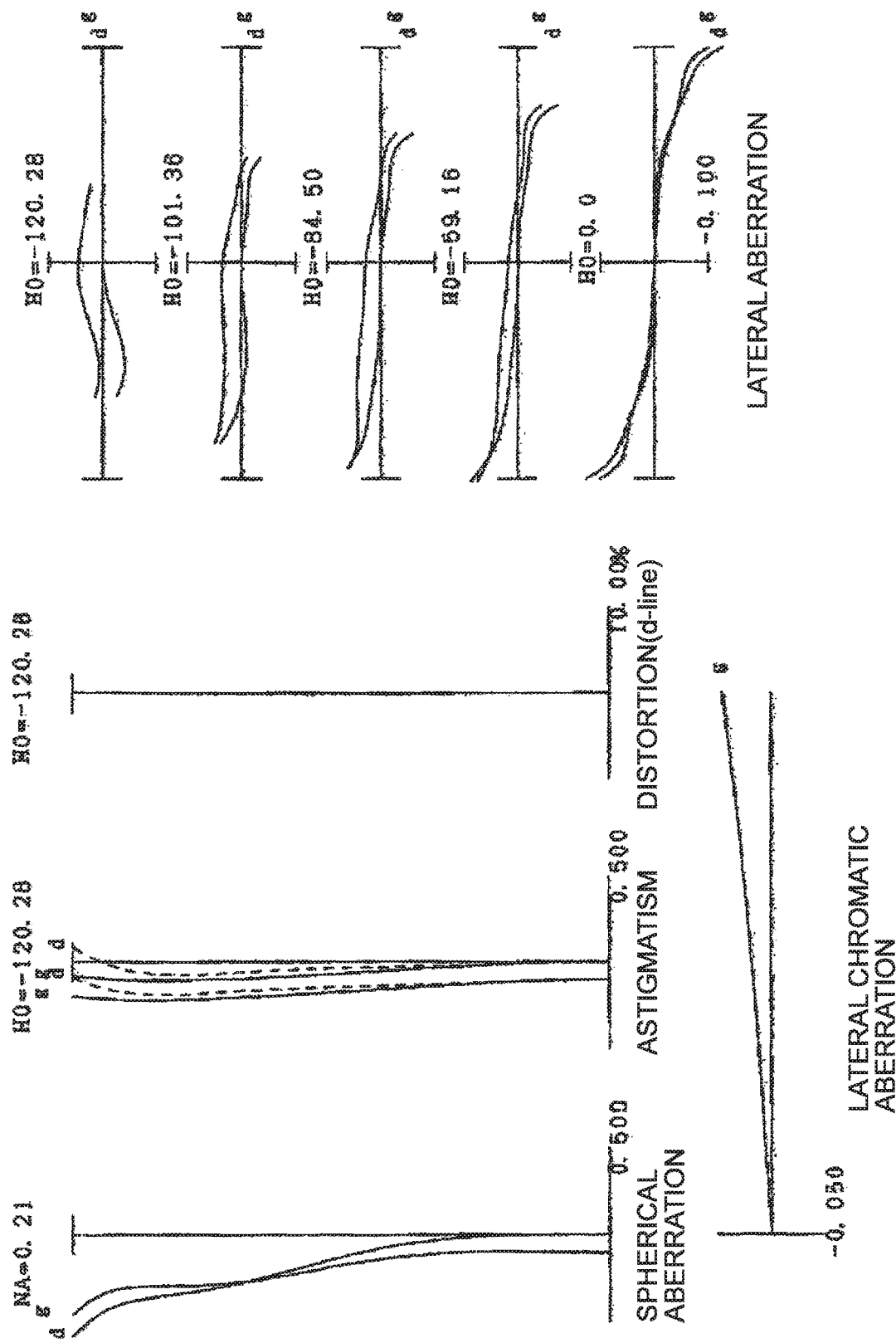
Figure 15C:
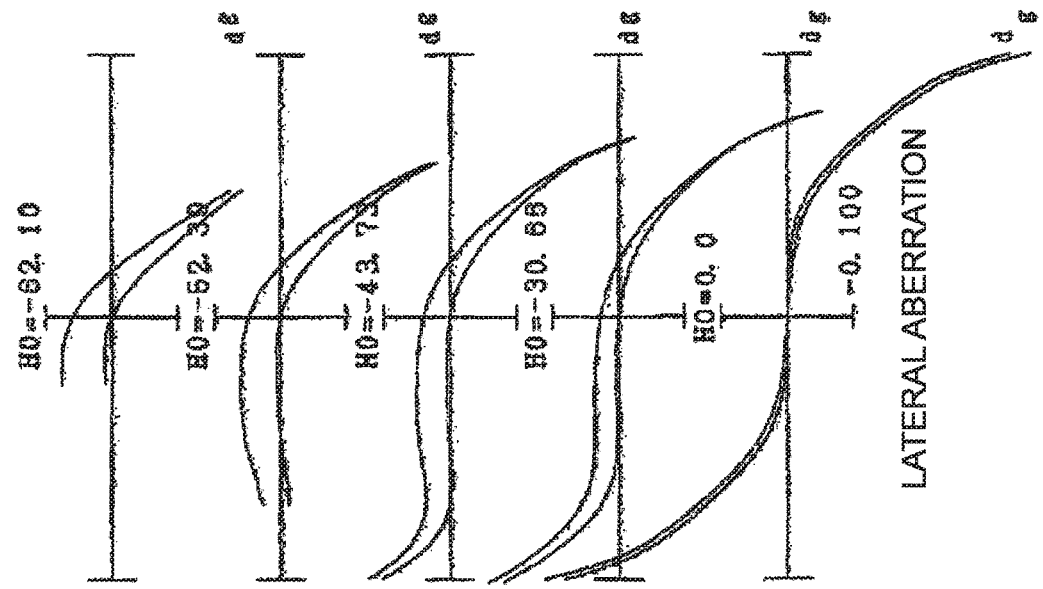
Figure 15C:
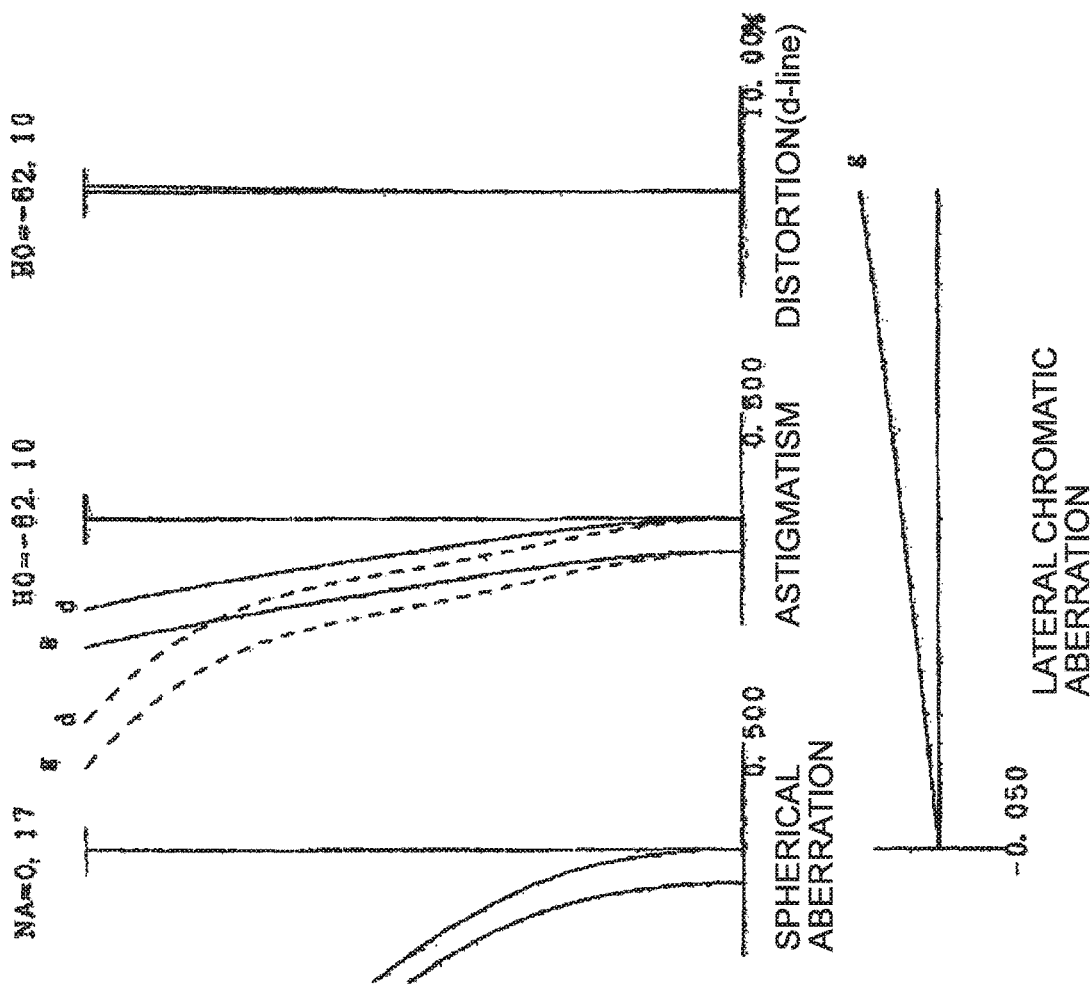

FIG. 12A, FIG. 13A, and FIG. 14A illustrate spherical aberrations, astigmatism aberrations, distortion aberrations, lateral chromatic aberrations, and lateral aberrations of the zoom optical system ZL3 in the wide angle end state, the intermediate focal length state, and the telephoto end state upon focusing on infinity. FIG. 12B, FIG. 13B, and FIG. 14B illustrate lateral aberrations of the zoom optical system ZL3 performing image blur correction in the wide angle end state, the intermediate focal length state, and the telephoto end state upon focusing on infinity. FIGS. 15A-15C illustrate spherical aberrations, astigmatism aberrations, distortion aberrations, lateral chromatic aberrations, and lateral aberrations of the zoom optical system ZL3 in the wide angle end state, the intermediate focal length state, and the telephoto end state upon focusing on a short distance object. It can be seen in these aberration graphs that the zoom optical system ZL3 can achieve an excellent imaging performance with various aberrations successfully corrected from the wide angle end state to the telephoto end state.

EXPLANATION OF NUMERALS AND CHARACTERS 1 camera (optical device)
ZL (ZL1 to ZL3) zoom optical system
G1 first lens group
G2 second lens group
G3 third lens group
G4 fourth lens group
G4A fourth-A lens group
G4B fourth-B lens group
G5 fifth lens group

The invention claimed is:
1. A zoom optical system comprising in order from an object:
a first lens group having positive refractive power;
a second lens group having negative refractive power;
a third lens group having positive refractive power;
a fourth lens group having negative refractive power; and a fifth lens group having positive refractive power, wherein upon zooming from a wide angle end state to a telephoto end state, the lens groups are moved along an optical axis to change a distance between the first lens group and the second lens group, a distance between the second lens group and the third lens group, a distance between the third lens group and the fourth lens group, and a distance between the fourth lens group and the fifth lens group, the fifth lens group includes at least one positive lens and at least one negative lens, and the following conditional expressions are satisfied:

$$2.50<f1/f3<4.20$$

$$0.80<(-f4)/f5w<2.50$$

$$FNw<3.50$$

$$3.50<ft/fw$$

$$0.30<fw/(-f4)<0.80$$

where, f1 denotes the focal length of the first lens group,
f3 denotes the focal length of the third lens group,
f4 denotes a focal length of the fourth lens group,
f5w denotes a composite focal length of an optical system on an image side including the fifth lens group in the wide angle end state,
FNw denotes an F number of the whole system in the wide angle end state,
ft denotes the focal length of the whole system in the telephoto end state, and
fw denotes a focal length of the whole system in the wide angle end state.

2. The zoom optical system according to claim 1, wherein the following conditional expressions are satisfied:

$$0.30<N5n-N5p$$

$$1.85<N5n$$

where,

N5n denotes an average refractive index with respect to a d line of all negative lens media in the fifth lens group, and
N5p denotes an average refractive index with respect to the d line of all positive lens media in the fifth lens group.

3. The zoom optical system according to claim 1, wherein the following conditional expression is satisfied:

$$FNt<4.50$$

where,

FNt denotes an F number of the whole system in the telephoto end state.

4. The zoom optical system according to claim 1, wherein upon zooming from the wide angle end state to the telephoto end state, the lens groups are moved along the optical axis so as to increase the distance between the first lens group and the second lens group,
decrease the distance between the second lens group and the third lens group,
increase the distance between the third lens group and the fourth lens group, and
decrease the distance between the fourth lens group and the fifth lens group.

5. The zoom optical system according to claim 1, wherein the following conditional expression is satisfied:

$$0.25<f2/f4<0.55$$

where, f2 denotes a focal length of the second lens group, and
f4 denotes a focal length of the fourth lens group.

6. The zoom optical system according to claim 1, wherein the following conditional expression is satisfied:

$$1.85<N2max$$

where,

N2max denotes a maximum absolute value of the refractive index with respect to a d line of a lens medium in the second lens group.

7. The zoom optical system according to claim 1, wherein the following conditional expression is satisfied:

$$0.4<fw/f3<1.00$$

where, f3 denotes a focal length of the third lens group.

8. The zoom optical system according to claim 1, wherein the following conditional expression is satisfied:

$$2.00<ft/f3<5.00$$

where, f3 denotes a focal length of the third lens group.

9. The zoom optical system according to claim 1, wherein the following conditional expression is satisfied:

$$1.50<ft/(-f4)<4.50.$$

10. The zoom optical system according to claim 1, wherein the following conditional expressions are satisfied:

$$0.30<N3n-N3p$$

$$1.85<N3n$$

where,

N3n denotes an average refractive index with respect to a d line of all negative lens media in the third lens group, and
N3p denotes an average refractive index with respect to the d line of all positive lens media in the third lens group.

11. The zoom optical system according to claim 1, wherein the following conditional expression is satisfied:

$$25.0°<\omega w<60.0°$$

where,

ωw denotes a half angle of view in the wide angle end state.

12. The zoom optical system according to claim 1, wherein the following conditional expression is satisfied:

$$3.0°<\omega t<20.0°$$

where,

ωt denotes a half angle of view in the telephoto end state.

13. The zoom optical system according to claim 1, wherein at least a portion of one of the first lens group, the second lens group, the third lens group, the fourth lens group, and the fifth lens group is moved to have a displacement component in a direction orthogonal to the optical axis.

14. The zoom optical system according to claim 1, wherein the fourth lens group includes a fourth-A lens group having negative refractive power, and
a fourth-B lens group having negative refractive power, wherein one of the fourth-A lens group and the fourth-B lens group is moved to have a displacement component in a direction orthogonal to the optical axis.

15. The zoom optical system according to claim 1, wherein the third lens group and the fifth lens group move toward the object upon zooming from the wide angle end state to the telephoto end state with a same movement amount with respect to an image surface.

16. The zoom optical system according to claim 1, wherein at least a part of the second lens group is moved along the optical axis upon focusing on a short distance object.

17. An optical device comprising the zoom optical system according to claim 1.

18. A method for manufacturing a zoom optical system including, in order from an object: a first lens group having positive refractive power; a second lens group having negative refractive power; a third lens group having positive refractive power; a fourth lens group having negative refractive power; and a fifth lens group having positive refractive power, the method comprising:
arranging the lens groups such that, upon zooming from a wide angle end state to a telephoto end state, the lens groups move along an optical axis to change a distance between the first lens group and the second lens group, a distance between the second lens group and the third lens group, a distance between the third lens group and the fourth lens group, and a distance between the fourth lens group and the fifth lens group;
arranging at least one positive lens and at least one negative lens in the fifth lens group; and
at least one of the following Features (A) or (B):
Feature (A):
satisfying the following conditional expressions:

$$2.50<f1/f3<4.20$$

$$0.80<(-f4)/f5w<2.50$$

$$FNw<3.50$$

$$3.50<ft/fw$$

$$0.30<fw/(-f4)<0.80$$

where,
f1 denotes the focal length of the first lens group,
f3 denotes the focal length of the third lens group,
f4 denotes a focal length of the fourth lens group,
f5w denotes a composite focal length of an optical system on an image side including the fifth lens group in the wide angle end state,
FNw denotes an F number of the whole system in the wide angle end state,
ft denotes the focal length of the whole system in the telephoto end state, and
fw denotes a focal length of the whole system in the wide angle end state;
Feature (B):
arranging the second lens group to move toward an object along the optical axis upon focusing on a short distance object from an infinitely distant object,
arranging at least a part of the fourth lens group located on an object side to be moved with a displacement component in a direction orthogonal to the optical axis, and satisfying the following conditional expressions:

$$0.80<(-f4)/f5w<2.50$$

$$FNw<3.30$$

$$0.30<fw/(-f4)<0.80$$

$$FNt<4.20$$

where,
f4 denotes a focal length of the fourth lens group,
f5w denotes a composite focal length of an optical system on an image side including the fifth lens group in the wide angle end state,
FNw denotes an F number of the whole system in the wide angle end state,
FNt denotes an F number of the whole system in the telephoto end state, and
fw denotes a focal length of the whole system in the wide angle end state.

19. A zoom optical system comprising in order from an object:
a first lens group having positive refractive power;
a second lens group having negative refractive power;
a third lens group having positive refractive power;
a fourth lens group having negative refractive power; and
a fifth lens group having positive refractive power, wherein
upon zooming from a wide angle end state to a telephoto end state, the lens groups are moved along an optical axis to change a distance between the first lens group and the second lens group, a distance between the second lens group and the third lens group, a distance between the third lens group and the fourth lens group, and a distance between the fourth lens group and the fifth lens group,
the fifth lens group includes at least one positive lens and at least one negative lens,
the second lens group is moved toward the object along the optical axis upon focusing on a short distance object from an infinitely distant object,
at least a part of the fourth lens group located on an object side is moved with a displacement component in a direction orthogonal to the optical axis, and
the following conditional expressions are satisfied:

$$0.80<(-f4)/f5w<2.50$$

$$FNw<3.30$$

$$0.30<fw/(-f4)<0.80$$

$$FNt<4.20$$

where,
f4 denotes a focal length of the fourth lens group,
f5w denotes a composite focal length of an optical system on an image side including the fifth lens group in the wide angle end state,
FNw denotes an F number of the whole system in the wide angle end state,
FNt denotes an F number of the whole system in the telephoto end state, and
fw denotes a focal length of the whole system in the wide angle end state.

20. The zoom optical system according to claim 19, wherein the following conditional expression is satisfied:

$$2.50<f1/f3<4.20$$

where,
f1 denotes a focal length of the first lens group, and
f3 denotes a focal length of the third lens group.

21. The zoom optical system according to claim 19, wherein the following conditional expression is satisfied:

$0.25 < f2/f4 < 0.55$ where,
f2 denotes a focal length of the second lens group.

22. The zoom optical system according to claim 19, wherein the following conditional expression is satisfied:

$0.40 < fw/f3 < 1.00$ where,
f3 denotes a focal length of the third lens group.

23. The zoom optical system according to claim 19, wherein the following conditional expression is satisfied:

$2.00 < ft/f3 < 5.00$ where,
f3 denotes a focal length of the third lens group, and
ft denotes the focal length of the whole system in the telephoto end state.

* * * * *